United States Patent
Vetter et al.

(10) Patent No.: US 9,487,972 B2
(45) Date of Patent: Nov. 8, 2016

(54) ELECTRONIC LOCKING MECHANISM

(71) Applicant: Bally Gaming, Inc., Las Vegas, NV (US)

(72) Inventors: Kay Daniel Vetter, Reno, NV (US); Joseph R. Hedrick, Reno, NV (US); Scott Thomas Hilbert, Sparks, NV (US)

(73) Assignee: Bally Gaming, Inc., Las Vegas, NV (US)

( * ) Notice: Subject to any disclaimer, the term of this patent is extended or adjusted under 35 U.S.C. 154(b) by 103 days.

(21) Appl. No.: 14/287,912

(22) Filed: May 27, 2014

(65) Prior Publication Data

US 2014/0353983 A1    Dec. 4, 2014

Related U.S. Application Data

(60) Provisional application No. 61/828,138, filed on May 28, 2013.

(51) Int. Cl.
*E05C 3/06* (2006.01)
*E05B 47/00* (2006.01)

(52) U.S. Cl.
CPC ...... *E05B 47/0012* (2013.01); *Y10T 292/1077* (2015.04)

(58) Field of Classification Search
USPC .................................. 292/214, 97, DIG. 37
See application file for complete search history.

(56) References Cited

U.S. PATENT DOCUMENTS

| | | | | |
|---|---|---|---|---|
| 1,899,997 A * | 3/1933 | Sullivan | ............... | E05B 13/101 292/357 |
| 3,302,964 A * | 2/1967 | Barry | ........................ | E05C 3/04 292/256 |
| 3,534,650 A * | 10/1970 | Kubokawa | ............ | F16B 19/109 24/453 |
| 5,076,080 A * | 12/1991 | Fuss | ........................ | E05C 3/042 292/66 |
| 6,116,660 A * | 9/2000 | Langkamp, Jr. | ...... | E05B 17/002 292/203 |
| 6,782,725 B2 * | 8/2004 | Linares | ................ | E05B 13/105 292/252 |
| 7,758,428 B2 | 7/2010 | Mattice et al. | | |
| 8,191,941 B2 * | 6/2012 | Ramsauer | ................ | E05B 9/08 292/194 |
| 8,336,931 B2 * | 12/2012 | Cotton | .................... | E05B 1/003 292/194 |
| 2008/0207314 A1 | 8/2008 | DiMichele | | |
| 2008/0207335 A1 | 8/2008 | DiMichele | | |

* cited by examiner

*Primary Examiner* — Mark Williams
(74) *Attorney, Agent, or Firm* — Philip J. Anderson; Marvin A. Hein

(57) ABSTRACT

An electronic lock and system particularly for replacing existing mechanical locks for gaming devices are disclosed herein. According to one embodiment, the gaming device includes a cabinet having a chassis and a main gaming device door locked by a mechanical lock. The electronic lock is configured to have a profile to replace the existing mechanical locks and includes a rotatable bolt receiving a sleeve. In a retained and locked position the sleeve is within the lock barrel and an operator is nested in a pocket in the barrel head. Upon receiving a command a motor rotates a cam and the sleeve is released to axially move to release the operator from the pocket for rotation of the sleeve and bolt to unlock the door. Sensors sense for fault conditions. Authentication is required to provoke the opening command Opening events may be logged at a system server or local memory.

12 Claims, 17 Drawing Sheets

ELECTRONIC LOCKING MECHANISM

CROSS REFERENCE TO RELATED APPLICATIONS

This application is a non-provisional application that claims priority to Provisional Application No. 61/828,138 filed May 28, 2013 and is incorporated by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention is directed to gaming devices, networked gaming systems and methods and, more particularly, to electronic locks adapted to be retrofit for existing mechanical locks for gaming devices, kiosks, vending machines or other equipment which use this type of lock.

2. Description of the Related Art

Security is a very important in many environments including casino venues. Typically, many casinos employ a wide variety of surveillance cameras to monitor the activity of both casino patrons and employees. Furthermore, a variety of security devices are utilized to restrict access to and from certain areas of the casino.

Additionally, various security measures are used to protect the internal spaces within gaming devices such as slot machines and kiosks found on the casino floor. Traditionally, mechanical locks have been used to restrict access to the interior space(s) of a gaming device. Commonly, the mechanical lock, may be unlocked by inserting a key into the lock. Once unlocked the bolt of the mechanical lock is rotated to free a latch for opening the door to the interior of the gaming device. For example, to provide maintenance, remove a cashbox or restock the gaming device with printable ticket coupons, a casino attendant is required to use one or more mechanical keys to open a particular door, remove a container, and close and lock the door with the key. This can be a cumbersome and time extensive task, especially when a casino employee needs to access more than one gaming device.

In some casino venues which may have thousands of gaming devices, typically a universal key is used to unlock a mechanical lock to release the latch to open the door of the gaming devices. Alternatively every gaming device has a unique key. Further, components within the gaming device, such as the coin hopper or bill box may be secured by an additional mechanical lock requiring additional keys to unlock the lock. Therefore, the number of keys needed to access the various gaming devices and compartments within the gaming devices, can easily grow to a large number of keys. Additionally, in the case of a lost key or security breach, the gaming devices must be re-keyed or the locks themselves replaced. The task of re-keying devices can become very expensive and very time consuming. For example if a casino employee loses their key(s) or perhaps is summarily discharged and does not return their key(s), the locks must be replaced or re-keyed and new keys issued to the employees.

The gaming device door lock is typically mounted on the side of an upright gaming device cabinet chassis and beneath the arm rest for a slant-type gaming device. These locks are relatively small and are typically tumbler pin locks that receive a tubular key or are cam locks of the type to receive a typical blade key which, when the proper key is inserted, release the lock bolt for rotation to free a latch to open the door.

When an attendant opens a gaming device door there may not be a record to indicate the identity of the attendant, the time of the opening and the nature of the required access. Gaming devices typically include within the device a retained, written machine entry access log (known by the acronym as the MEAL ticket) for attendants gaining access to record the event, e.g. maintenance event, operational fault or the like. However if the attendant fails to record the event the access event may not be recorded. Of course security cameras may capture the attendant to make sure the access is authorized or to investigate an unauthorized access event.

It has been known to provide new electronically activated locks in lieu of the traditional mechanical locks such as disclosed in now abandoned DiMichele, U.S. Pub App U.S. 2008/0207314 filed Feb. 23, 2007, titled "Automated Locking System" and DiMichele, and U.S. Pub App U.S. 2008/0207335 both filed Feb. 23, 2007 and titled "Automated Locking System", the disclosures of which are incorporated by reference. These disclosures describe a new locking mechanism controlled by a processor such as to control a solenoid or electric motor to move a bolt. Authentication is required to control the lock. Mattice et al, U.S. Pat. No. 7,758,428 filed Apr. 2, 2001 and titled "Method and Apparatus for Controlling Access to Areas of Gaming Machines", the disclosure of which is incorporated by reference, also discloses a solenoid lock for controlling access to a gaming machine compartment which includes a keyed manual override.

A drawback to these prior electronic locks is that they are unsuitable for replacing the known standard mechanical lock(s) on gaming machines thus requiring extensive conversion for existing gaming machines to accept these locks. This increases the expense for converting to electronic locks for a casino enterprise. The expense is not only related to the mechanical re-fitting of the gaming device to receive the locks but also the expense of removing the gaming device from play for conversion period.

Such mechanical locks can also be found on kiosks in a casino provided for cashing out printed gaming vouchers.

Outside of the casino environment mechanical locks of the type described may be found on furniture such as file cabinets or mail boxes.

It would be advantageous if an electronic lock could be provided which is adapted to be mounted and assume the footprint of existing mechanical locks thus minimizing the expense of converting the gaming and other equipment to different electronic locks. This expense is not only related to the mechanical re-fitting of the device to receive the prior art electronic locks but also the expense of removing the device from service during the conversion period.

It would be advantageous if an electronic lock could be provided which is simple and has few moving parts contributing to reliability.

It would be advantageous to provide for a battery back-up for an electronic lock to permit operation in the event of a power failure.

It would be advantageous to provide for an external override for electronic locks in the event of an unrecoverable fault.

It would be advantageous if an electronic could be provided according to the above mentioned features which could be used to replace similar locks to vending machines, kiosks, gang mailboxes or other equipment.

SUMMARY OF THE INVENTION

Briefly, and in general terms, various embodiments are directed to a system and electronic lock adapted to replace exiting mechanical locks for gaming devices and similar devices. According to one embodiment, an electronic lock is provided for replacing a mechanical lock for a gaming device having a cabinet including a door locked by the mechanical lock closed to secure an interior space of the cabinet, the mechanical lock having an exterior profile to be received through and secured in an opening in one of the cabinet and door and a rotatable foot to, in a locked position, engage structure to lock the door closed and in an unlocked position disengage said structure to unlock the door. The electronic lock includes a barrel having an exterior profile corresponding to the exterior profile of the mechanical lock to be received and secured in the opening to replace the prior mechanical lock and a lock bolt axially disposed within the barrel for axial rotation and having one end adapted to receive the foot. A cylindrical sleeve is disposed about the barrel and has at one end an operator. The sleeve mounted to the bolt for rotation therewith and for axial displacement along the bolt from a retained to a released position. A motor is disposed between at least one of the bolt and sleeve to rotate at one end a cam. At least one tang is disposed between said bolt and sleeve and includes a follower engaging the cam. The cam in a first position causes the tang to capture the sleeve in the retained position and in a second position to release the sleeve for axial displacement from the retained position to a released position. The barrel includes at one end a head having a pocket to receive and nest the operator when the sleeve is in the retained position to prevent rotation of the sleeve, bolt and foot for unlocking the door. A controller is adapted to receive commands through the network for controlling the motor to rotate the cam between the first and second positions. When the electronic lock is in a locked condition and upon the controller receiving an unlock command the motor is energized to rotate the cam causing the tang to release the sleeve for axial displacement from the retained position. A spring may bias the sleeve in this condition to spring axially to the released position where the operator moves from the pocket for rotation of the sleeve, bolt and foot to unlock the lock. Sensors may be provided to sense the position of the cam. In an embodiment the tang may be biased follow the cam and toward a retained position whereupon the motor may be rotated through a full 360 of rotation such that during the rotation, when the tang disengages the sleeve the bias for the sleeve causes the sleeve to be released for axial displacement. When the lock is unlocked any latch may be manipulated to unlatch the door and open the space. When in an unlocked position, the attendant rotates the operator, sleeve and bolt to align the operator with the pocket and the operator and sleeve are moved axially until the tang recaptures the sleeve in the retained position.

In a further embodiment the pocket and head may have an asymmetric cross-section to prevent rotation of the operator when nested in the pocket.

In an embodiment sensors, such as Hall-effect, may sense the position of the rotor as well as a fault condition.

In an embodiment the network may be a wired or wireless network.

In an embodiment prior to issuance of an unlocking command the gaming device/system/network authorizes the attendant though various techniques such as biometric identification (fingerprint, iris scan, voice print, facial identification), PIN, a portable identification instrument such as a magnetic card or wireless device.

In an embodiment the electronic lock controller may include a wireless receiver/receiver-transceiver adapted to receive wireless commands from the network and/or a portable device.

In an embodiment the system/network is adapted to store event data such as gaming machine number, time and date, the identity and authorization for the attendant seeking access and requesting the open command and the nature of the event.

The features and advantages of the electronic lock and system of the present invention may be exploited in other environments such as arcades, vending machine environments, storage lockers, merchandise display cases or the like.

Other features and advantages will become apparent from the following detailed description, taken in conjunction with the accompanying drawings, which illustrate by way of example, the features of the various embodiments.

DETAILED DESCRIPTION OF THE EMBODIMENTS

Figure 1A:
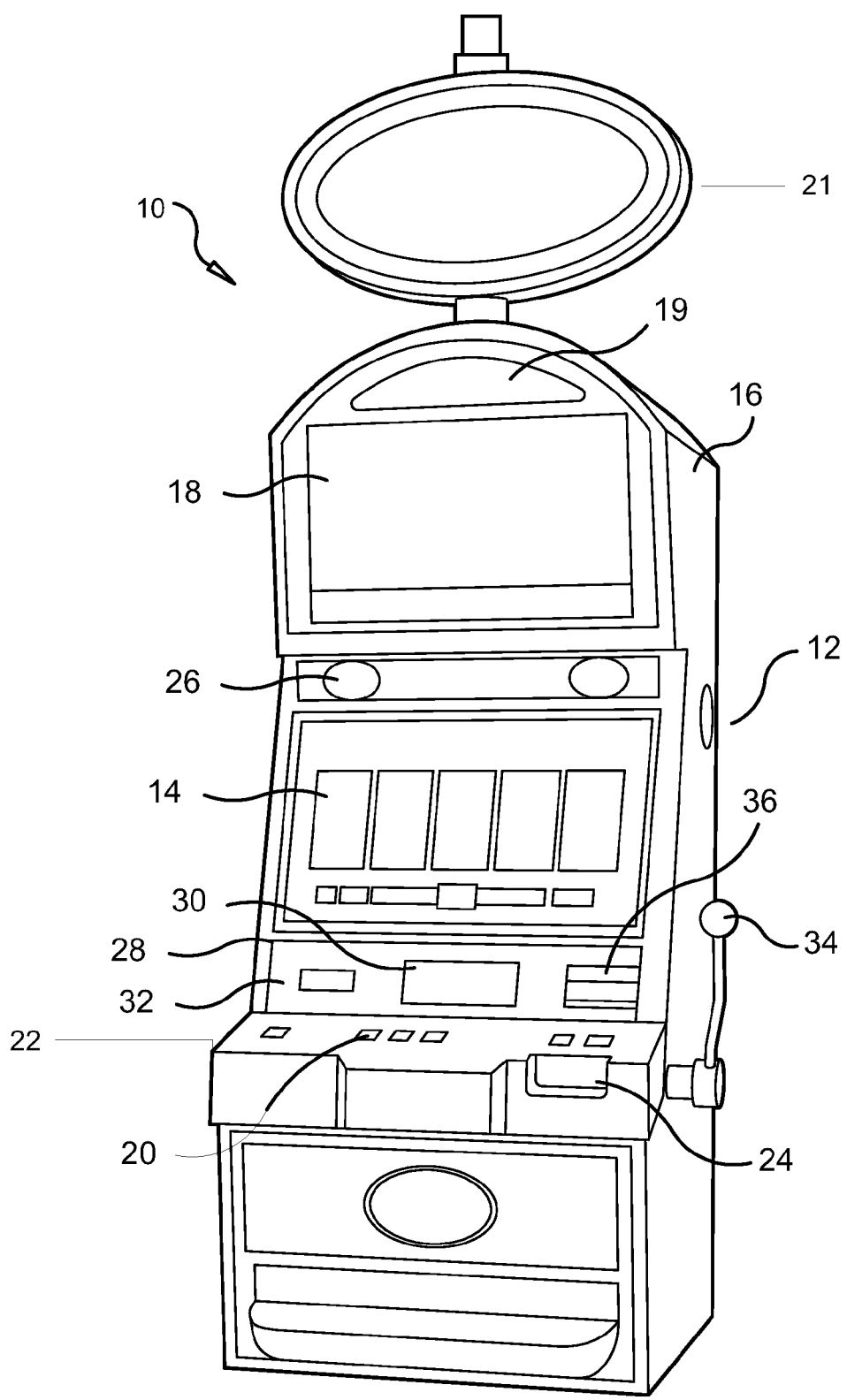
FIG. 1A is an illustration of an example of a gaming device according to the prior art.

Systems and methods disclosed herein provide an automated locking system for controlling one or more locking mechanisms used in combination with various devices and components of a gaming system. Generally, locks are used to secure gaming device doors to control access to the interior of the gaming device. Traditionally, mechanical key and lock employed to secure the gaming device. Additionally, components and devices within the gaming device, such as cash boxes, voucher boxes, and coin boxes may also be secured with mechanical key and lock. The systems and methods disclosed herein provide an automated locking system that removes the need for mechanical keys as the primary means for unlocking mechanical locks used in connection with a gaming device, or entire casino gaming system. Additionally, the automated locking system that may be used in combination with any access panel or door requiring secure access.

Referring now to the drawings, a brief description of the environment for the present invention will be provided. While the following description is directed toward a new electronic lock for use with gaming devices such as slot machines, it should be understood that the electronic lock can be used in other environments such as office file cabinets, mail boxes, arcades and the like.

Environment—Gaming Devices and Networks

Referring now to the drawings, wherein like reference numbers denote like or corresponding elements throughout the drawings, and more particularly referring to FIG. 1, a gaming device 10 according to the prior art is illustrated. The gaming device 10 includes cabinet 12 providing a secure enclosure for the several components of the gaming device 10 and associated equipment. While not shown, the gaming device 10 is coupled to a power supply at the venue. A primary game display 14 is mounted to the cabinet 12. The primary game display 14 may be a video display such as an LCD, plasma, OLED or other electronic display or it may be an electro-mechanical display such as electro-mechanical stepper reels as are known in the art. The primary game display 14 may also be embodied as a combination of two or more electronic or mechanical displays disposed in an adjacent overlapping or overlying arrangement. The primary game display 14 may be mounted to one or more of a door for the cabinet 12 or the cabinet chassis itself. The primary game display 14 is located to display game content (and if desired other content) to the player. The cabinet 12 may comprise a slant-top, bar-top, or table-top style cabinet as is known in the art.

The gaming device 10 also includes in one or more embodiments a top box 16 which may support a printed back-lit glass (not shown) as is known in the art depicting the rules, award schedule, attract graphics or it may support a secondary game display 18 which may be of one of the types described above with reference to the primary game display 14. The top box 16 may also support a backlit glass with graphics defining a marquee 19 and a topper 21 including additional graphics.

To enable a player to provide input to the controller for the gaming device 10 a plurality of buttons 20 may be provided on a button deck 22 for the gaming device 10. Additionally and alternatively one or both of the primary and secondary game displays 14, 18 may include touch screen input devices as are known in the art. Buttons, selections or inputs are displayed at the primary and secondary game displays 14, 18 and the player touching those icons or designated areas provides the required or desired input to configure and play the gaming device 10.

Other peripherals or associated equipment for the gaming device 10 include a bill/voucher acceptor 24 which reads and validates currency and vouchers for the player to establish credits for gaming on the gaming device 10 and one or more speakers 26 to provide audio to the player in association with the game play. To provide for player communication between the gaming device 10 and a casino system, a player tracking module (PTM) 28 is mounted on the cabinet 12. PTM 28 has a PTM display 30 to display system related information to the player. The PTM display 30 may be a small LCD, plasma or OLED display with touch screen functionality or other player/user interface such as buttons as is known in the art. A card reader 32 is provided to read a machine readable component on a player loyalty card issued to the player to identify the player or an attendant to the casino system as in known in the art. A ticket printer 36 may be provided as well on the PTM 28 or elsewhere on the gaming device 10 to provide printed value ticket vouchers to players as is known in the art.

Some functionality of the PTM 28 may be provided by a video switcher and touch router device as is described in U.S. Pub. App. 2009/0149253 entitled "Video Switcher and Touch Router Method for a Gaming Machine" filed Jan. 8, 2009 and incorporated by reference. According to this disclosure system and externally based content may be displayed at one or more of the primary or secondary displays 14, 18 dispensing with the need for the PTM display 30.

While the player may use the buttons 20 to prompt play of the game (or the touch screen input), alternatively the player may use a handle 34 to prompt an input as is known in the art.

Cabinet housing 12 may be a self-standing unit that is generally rectangular in shape and may be manufactured with reinforced steel or other rigid materials which are resistant to tampering and vandalism. Any shaped cabinet may be implemented with any embodiment of gaming machine 10 so long as it provides access to a player for playing a game. For example, cabinet 12 may comprise a slant-top, bar-top, or table-top style cabinet, including a Bally Cinevision™ or CineReels™ cabinet. The gaming device 10 may include a controller and memory disposed within the cabinet 12 or may have thin client capability such as that some of the computing capability is maintained at a remote server.

The plurality of player-activated buttons 22 may be used for various functions such as, but not limited to, selecting a wager denomination, selecting a game to be played, selecting a wager amount per game, initiating a game, or cashing out money from gaming machine 10. Buttons 22 may be operable as input mechanisms and may include mechanical buttons, electromechanical buttons or touch screen buttons. Player input may also be by providing touch screen functionality at the primary display 14 and/or secondary display 18.

Figure 1B:
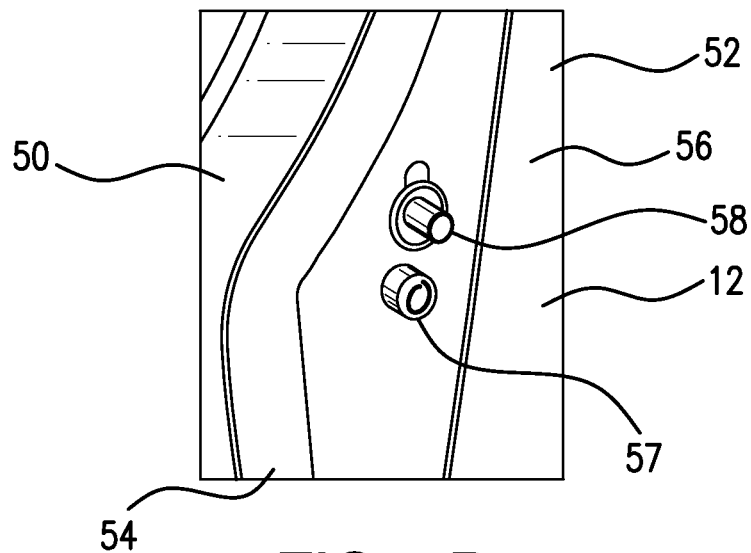
FIG. 1B is a close up view of a mechanical lock mounted to a gaming device cabinet and the opening latch according to the prior art.

FIG. 1B is a close-up view of the door 50 of the cabinet 12 as closed against the gaming device cabinet chassis 52. When closed the door 50 prevents unauthorized access into the interior of the gaming device 10. In its closed position the door rests against the jam 54. A latch handle 56 extends through the wall of the cabinet 12 chassis and is vertically moveable to latch and unlatch the door 50. When unlatched the door 50 can be opened. A mechanical lock 58 is disposed in FIG. 1 below the handle 56 and is secured through a bore 57 through the chassis wall. While the mechanical lock is shown as a tumbler pin lock that receives a tubular key or it may be a cam lock of the type to receive a typical blade key.

Figure 1C:
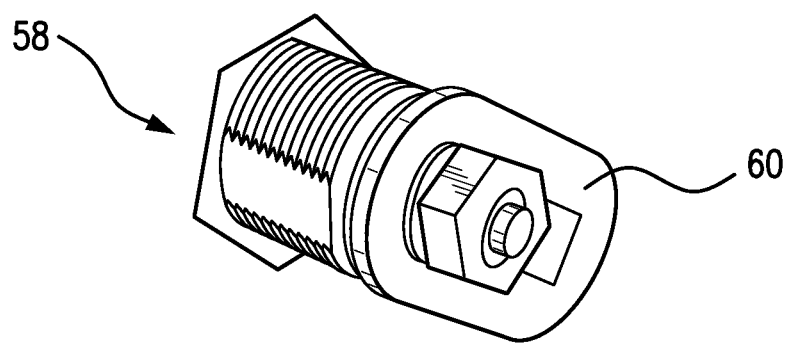
FIG. 1C is a close up interior view of the mechanical lock according to the prior art.

Referring to FIG. 1C the mechanical lock 58 includes a rotatable bolt (not shown) which mounts a foot 60 disposed to restrain the latch against unlatching the door when in a locked position and to release the latch for vertical movement to unlatch the door when in the unlocked position. When an attendant inserts the correct tubular key pins within the lock are moved to permit rotation of the lock bolt between the locked and unlocked position.

While the foot 60 may engage a latch plate or other structure it should be understood that according to the art the foot may be configured to manipulate a linkage or other structure to release the door 50 for opening with or without a latching mechanism.

As can be appreciated re-keying the gaming devices 10 on a casino floor which may include thousands of gaming devices 10 can be seen as a daunting task. Often the locks are replaced to, in effect, re-key the door lock. Further replacing the mechanical locks with different, electronic lock structures would also be a time consuming and expensive task. It is desirable to provide an electronic lock which can replace a mechanical lock and substantially match the old mechanical lock footprint for the gaming device 10.

Figure 2A:
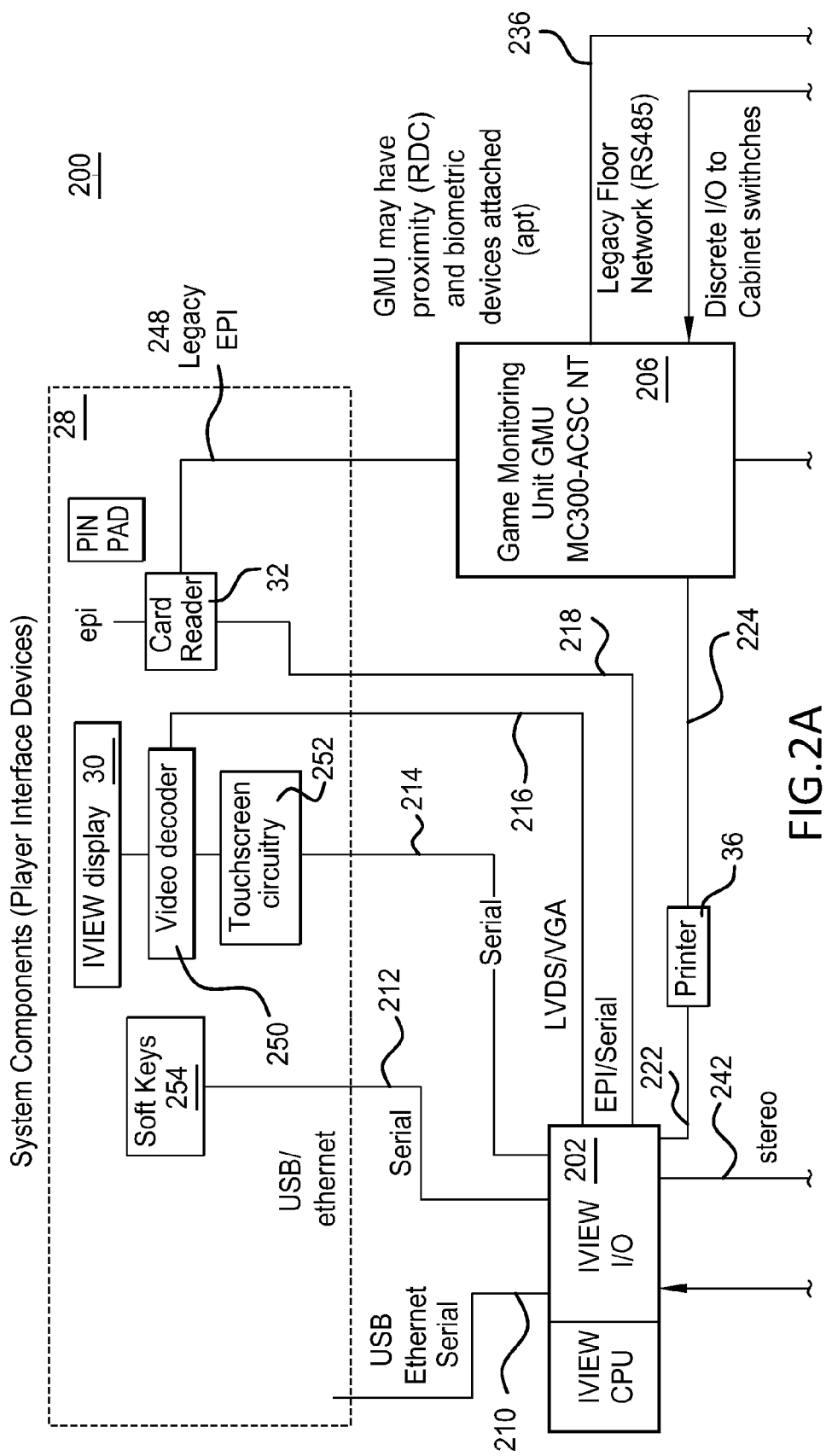
FIGS. 2A-B are a block diagram of the physical and logical components of a gaming device according to the prior art.
Figure 2B:
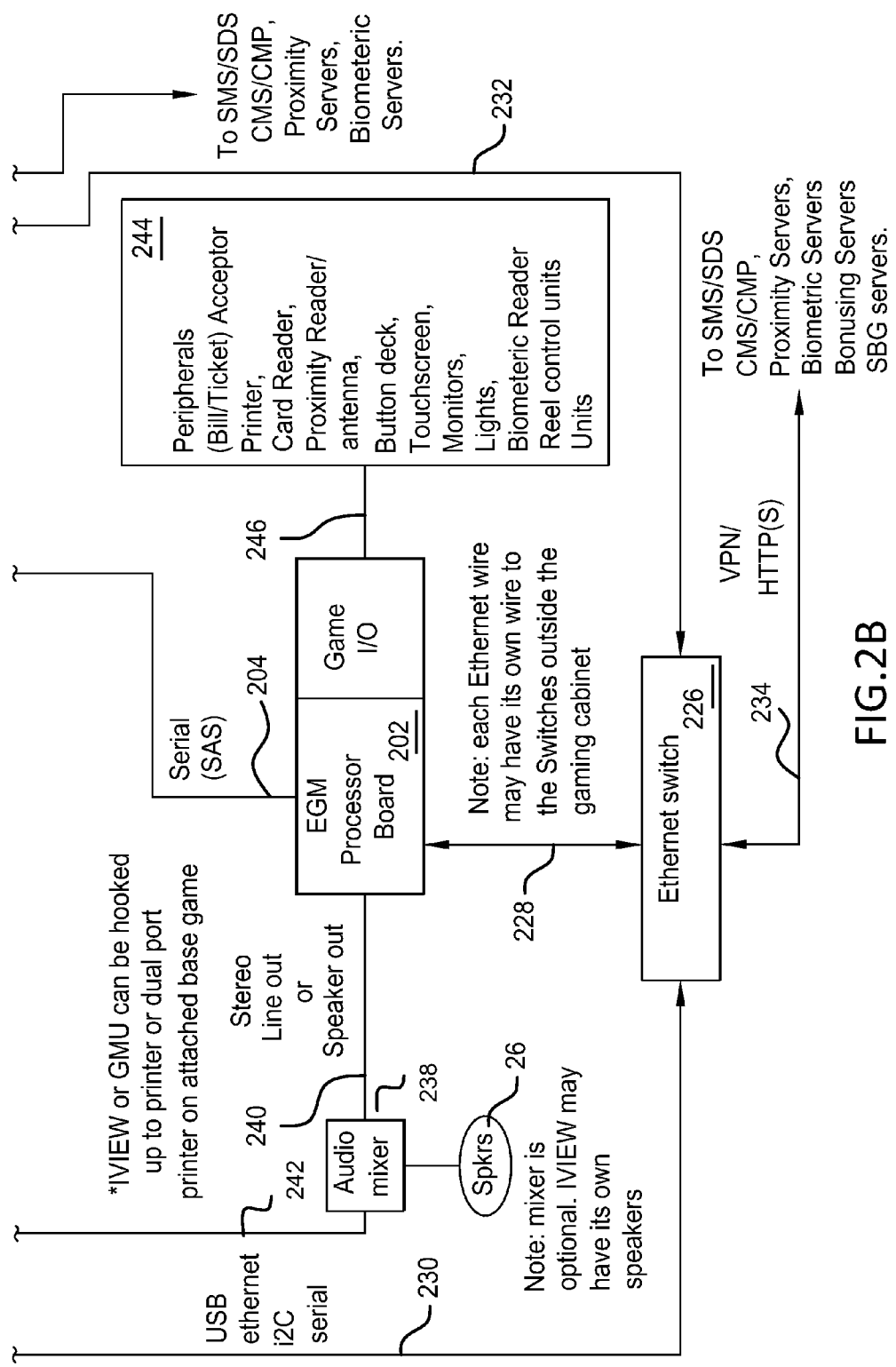

Referring to FIGS. 2A, B, the gaming device 100 hardware 200 for the gaming device 10 according to the prior art is shown. The hardware 200 is described herein inasmuch as the electronic lock may interface with the gaming device 10 hardware 200 or with the network through the hardware. The hardware 200 includes base game integrated circuit board 202 (EGM Processor Board) connected through serial bus line 204 to game monitoring unit (GMU) 206 (such as a Bally MC300 or ACSC NT), and player interface integrated I/O circuit board (PIB) 202 connected to the player tracking module (PTM) 28 over bus lines 210, 212, 214, 216, 218. The PTM 28 provides for communication between one or more gaming devices 10 and the casino system over the network such as the type as hereinafter described. Inasmuch as gaming devices 10 may be manufactured by different entities, mounting like PTMs 28 at each gaming device 10 provides for communication to the system in one or more common message protocols. Gaming voucher ticket printer 36 (for printing player cash out tickets) is connected to PIB 208 and GMU 206 over bus lines 222, 224. EGM Processor Board 202, PIB 202, and GMU 206 connect to Ethernet switch 226 over bus lines 228, 230, 232. Ethernet switch 226 connects to a slot management system and a casino management system (SMS, SDS, CMS and CMP) (FIGS. 4A, B) network over bus line 234. Ethernet switch 226 may also connect to a server based gaming server or a downloadable gaming server. GMU 206 also may connect to the network over bus line 236. Speakers 26 to produce sounds related to the game or according to the present invention connect through audio mixer 238 and bus lines 240, 242 to EGM Processor Board 202 and PIB 208.

Peripherals 244 connect through bus 246 to EGM Processor Board 202. The peripherals 244 include, but are not limited to the following and may include individual processing capability: bill/voucher acceptor 24 to validate and accept currency and ticket vouchers, the player interfaces such a buttons 20, primary and secondary game displays 14, 18 and any secondary or tertiary displays (with/without) touch screen functionality, monitors and lights. The peripherals 244 may include the displays as hereinafter described with reference to the various embodiments of the present invention as herein described or their equivalents. For example, the bill/voucher acceptor 24 is typically connected to the game input-output board of the EGM processing board 202 (which is, in turn, connected to a conventional central processing unit ("CPU") board), such as an Intel Pentium® microprocessor mounted on a gaming motherboard. The I/O board may be connected to CPU processor board by a serial connection such as RS-232 or USB or may be attached to the processor by a bus such as, but not limited to, an ISA bus. The gaming motherboard may be mounted with other conventional components, such as are found on conventional personal computer motherboards, and loaded with a game program which may include a gaming machine operating system (OS), such as a Bally Alpha OS. EGM processor board 202 executes a game program that causes the gaming terminal 10 to display and play a game. The various components and included devices may be installed with conventionally and/or commercially available components, devices, and circuitry into a conventional and/or commercially available gaming terminal cabinet 12. The electronic lock according to the one or more embodiments of the present invention may also be considered a peripheral and connected to the bus 246.

When a player has inserted a form of currency such as, for example and without limitation, paper currency, coins or tokens, cashless tickets or vouchers, electronic funds transfers or the like into the currency acceptor, a signal is sent by way of bus 246 to the I/O board and to EGM processor board 202 which, in turn, assigns an appropriate number of credits for play in accordance with the game program. The player may further control the operation of the gaming machine by way of other peripherals 244, for example, to select the amount to wager via the buttons 20. The game starts in response to the player operating a start mechanism such as the handle 34, button 20 such as a SPIN/RESET button or a touch screen icon. The game program includes a random number generator to provide a display of randomly selected indicia on one or more displays such as the primary game display 14 as shown in FIG. 1. In some embodiments, the random generator may be physically separate from gaming terminal 10; for example, it may be part of a central determination host system which provides random game outcomes to the game program. Finally, EGM processor board 202 under control of the game program and OS compares the outcome to an award schedule. The set of possible game outcomes may include a subset of outcomes related to the triggering and play of a feature or bonus game. In the event the displayed outcome is a member of this subset, EGM processor board 202, under control of the game program and by way of EGM Processor Board 202, may cause feature game play to be presented on the primary game display 14 and/or any secondary display(s) 18.

Predetermined payout amounts for certain outcomes, including feature game outcomes, are stored as part of the game program. Such payout amounts are, in response to instructions from EGM Processor Board 202, provided to the player in the form of coins, credits or currency via I/O board and a pay mechanism, which may be one or more of a credit meter, a coin hopper, a voucher printer, an electronic funds transfer protocol or any other payout means known or developed in the art.

In various embodiments, the game program is stored in a memory device (not shown) connected to or mounted on the gaming motherboard. By way of example, but not by limitation, such memory devices include external memory devices, hard drives, CD-ROMs, DVDs, and flash memory cards. In an alternative embodiment, the game programs are stored in a remote storage device. In an embodiment, the remote storage device is housed in a remote server such as a downloadable gaming server. The gaming machine may access the remote storage device via a network connection, including but not limited to, a local area network connection, a TCP/IP connection, a wireless connection, or any other means for operatively networking components together. Optionally, other data including graphics, sound files and other media data for use with the gaming terminal are stored in the same or a separate memory device (not shown). Some or all of the game program and its associated data may be loaded from one memory device into another, for example, from flash memory to random access memory (RAM).

In one or more embodiments, peripherals may be connected to the system over Ethernet connections directly to the appropriate server or tied to the system controller inside the gaming terminal using USB, serial or Ethernet connections. Each of the respective devices may have upgrades to their firmware utilizing these connections.

GMU 206 includes an integrated circuit board and GMU processor and memory including coding for network communications, such as the G2S (game-to-system) protocol from the Gaming Standards Association, Las Vegas, Nev., used for system communications over the network. As shown, GMU 206 may connect to the card reader 32 through bus 248 and may thereby obtain player information and transmit the information over the network through bus 236. Gaming activity information may be transferred by the EGM Processor Board 202 to GMU 206 where the information may be translated into a network protocol, such as S2S, for transmission to a server, such as a player tracking server, where information about a player's playing activity may be stored in a designated server database.

PID 208 includes an integrated circuit board, PID processor, and memory which includes an operating system, such as Windows CE, a player interface program which may be executable by the PID 208 processor together with various input/output (I/O) drivers for respective devices which connect to PID 208, such as player tracking module 28, and which may further include various games or game components playable on PID 208 or playable on a connected network server and PID 208 is operable as the player interface. PID 208 connects to card reader 24 through bus 218, player tracking display 30 through video decoder 250 and bus 216, such as an LVDS or VGA bus.

As part of its programming, the PID 208 processor executes coding to drive player tracking display 30 and provide messages and information to a player. Touch screen circuitry 252 interactively connects display 30 and video decoder 250 to PID 208 such that a player may input information and cause the information to be transmitted to PID 208 either on the player's initiative or responsive to a query by PID 208. Additionally soft keys 254 connect through bus 212 to PID 208 and operate together with the player tracking display 30 to provide information or queries to a player and receive responses or queries from the player. PID 208, in turn, communicates over the CMS/SMS network through Ethernet switch 226 and busses 230, 234 and with respective servers, such as a player tracking server.

PTMs 28 are linked into the virtual private network of the system components in gaming terminal 10. The system components include the player tacking module 28 (e.g. Bally iVIEW® device) ("iView" is a registered trademark of Bally Gaming, Inc.) processing board 202 and game monitoring unit (GMU) processing board 206. These system components may connect over a network to the slot management system (such as a commercially available Bally SDS/SMS) and/or casino management system (such as a commercially available Bally CMP/CMS).

The GMU 206 system component has a connection to the base game through a serial SAS connection and is connected to various servers using, for example, HTTPs over Ethernet. Through this connection, firmware, media, operating system software, gaming machine configurations can be downloaded to the system components from the servers. This data is authenticated prior to installation on the system components.

The system components include the PTM 28 processing board and game monitoring unit (GMU) 206. The GMU 206 and PTM 28 can be combined into one like the commercially available Bally GTM iVIEW device. This device may have a video mixing technology to mix the EGM processor's video signals with the iVIEW display onto the top box monitor or any monitor on the gaming device.

Figure 2C:
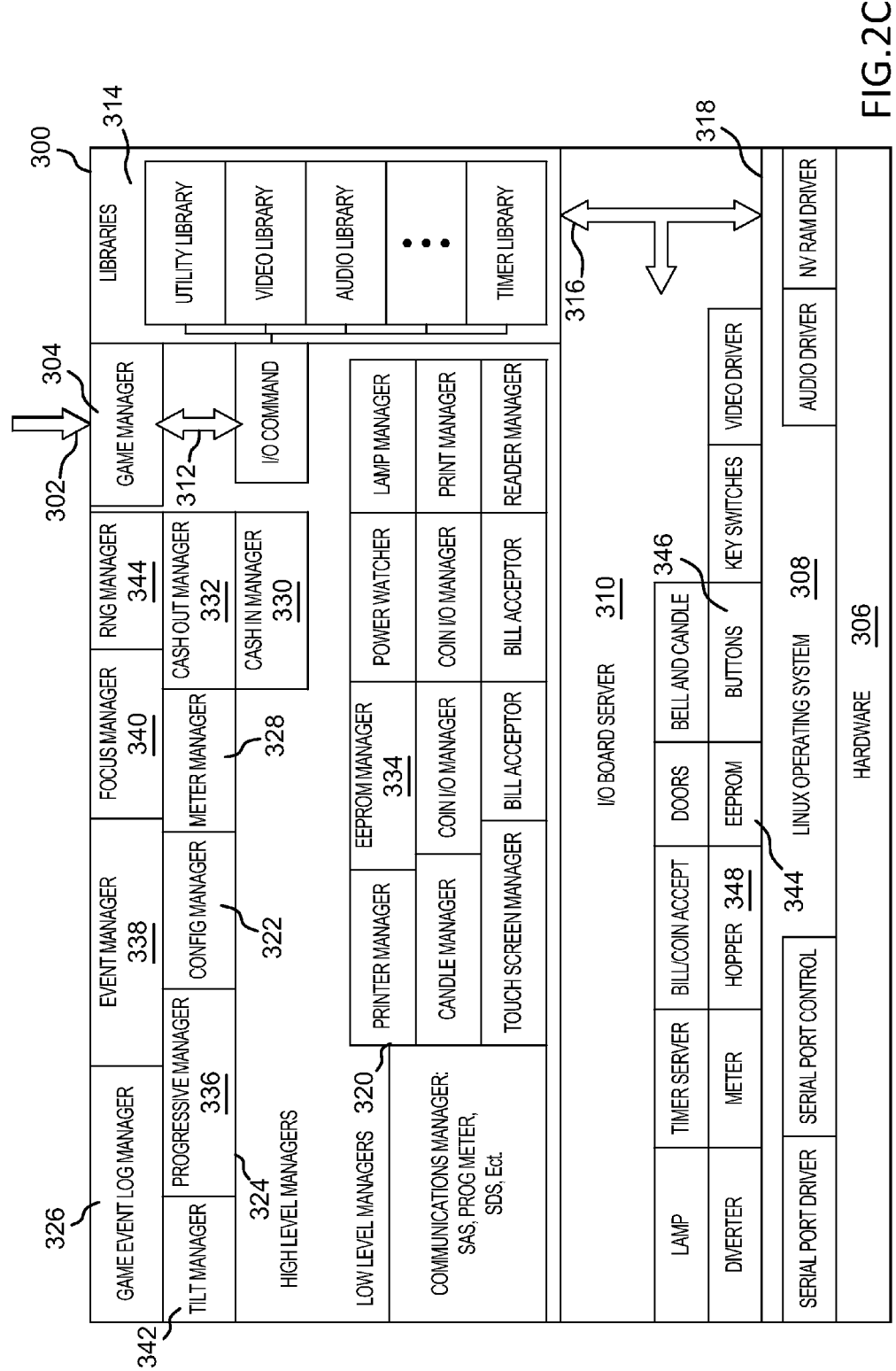
FIG. 2C is a diagram of a gaming kernel of the gaming machine according to the prior art of FIG. 1.

In accordance with one or more embodiments, FIG. 2C is a functional block diagram of a gaming kernel 300 of a game program under control of gaming terminal processor board 202. The game program uses gaming kernel 300 by calling into application programming interface (API) 302, which is part of game manager 304. The components of game kernel 300 as shown in FIG. 2C are only illustrative, and should not be considered limiting. For example, the number of managers may be changed, additional managers may be added or some managers may be removed without deviating from the scope and spirit of the invention.

As shown in the example, there are three layers: a hardware layer 306; an operating system layer 308, such as, but not limited to, Linux; and a game kernel layer 300 having game manager 304 therein. In one or more embodiments, the use of an operating system layer 308, such a UNIX-based or Windows-based operating system, allows game developers interfacing to the gaming kernel to use any of a number of standard development tools and environments available for the operating systems. This is in contrast to the use of proprietary, low level interfaces which may require significant time and engineering investments for each game upgrade, hardware upgrade, or feature upgrade. The game kernel layer 300 executes at the user level of the operating system layer 308, and itself contains a major component called the I/O board server 310. To properly set the bounds of game application software (making integrity checking easier), all game applications interact with gaming kernel 300 using a single API 302 in game manager 304. This enables game applications to make use of a well-defined, consistent interface, as well as making access points to gaming kernel 300 controlled, where overall access is controlled using separate processes.

For example, game manager 304 parses an incoming command stream and, when a command dealing with I/O comes in (arrow 312), the command is sent to an applicable library routine 314. Library routine 314 decides what it needs from a device, and sends commands to I/O board server 310 (see arrow 316). A few specific drivers remain in operating system layer 308's kernel, shown as those below line 318. These are built-in, primitive, or privileged drivers that are (i) general (ii) kept to a minimum and (iii) are easier to leave than extract. In such cases, the low-level communications is handled within operating system layer 308 and the contents passed to library routines 314.

Thus, in a few cases library routines may interact with drivers inside operating system layer 308, which is why arrow 316 is shown as having three directions (between library routines 314 and I/O board server 310, or between library routines 314 and certain drivers in operating system layer 308). No matter which path is taken, the logic needed to work with each device is coded into modules in the user layer of the diagram. Operating system layer 310 is kept as simple, stripped down, and common across as many hardware platforms as possible. The library utilities and user-level drivers change as dictated by the game cabinet or game machine in which it will run. Thus, each game cabinet or game machine may have an industry standard EGM processing board 202 connected to a unique, relatively dumb, and as inexpensive as possible I/O adapter board, plus a gaming kernel 300 which will have the game-machine-unique library routines and I/O board server 310 components needed to enable game applications to interact with the gaming machine cabinet. Note that these differences are invisible to the game application software with the exception of certain functional differences (i.e., if a gaming cabinet has stereo sound, the game application will be able make use of API 302 to use the capability over that of a cabinet having traditional monaural sound).

Game manager 304 provides an interface into game kernel 300, providing consistent, predictable, and backwards compatible calling methods, syntax, and capabilities by way of game application API 302. This enables the game developer to be free of dealing directly with the hardware, including the freedom to not have to deal with low-level drivers as well as the freedom to not have to program lower level managers 320, although lower level managers 320 may be accessible through game manager 304's interface 302 if a programmer has the need. In addition to the freedom derived from not having to deal with the hardware level drivers and the freedom of having consistent, callable, object-oriented interfaces to software managers of those components (drivers), game manager 304 provides access to a set of upper level managers 320 also having the advantages of consistent callable, object-oriented interfaces, and further providing the types and kinds of base functionality required in casino-type games. Game manager 304, providing all the advantages of its consistent and richly functional game application API 302 as supported by the rest of game kernel 300, thus provides a game developer with a multitude of advantages.

Game manager 304 may have several objects within itself, including an initialization object (not shown). The initialization object performs the initialization of the entire game machine, including other objects, after game manager 304 has started its internal objects and servers in appropriate order. In order to carry out this function, the kernel's configuration manager 322 is among the first objects to be started; configuration manager 322 has data needed to initialize and correctly configure other objects or servers.

The high level managers 324 of game kernel 300 may include game event log manager 326 which provides, at the least, a logging or logger base class, enabling other logging objects to be derived from this base object. The logger object is a generic logger; that is, it is not aware of the contents of logged messages and events. The game event log manager's 326 job is to log events in non-volatile event log space. The size of the space may be fixed, although the size of the logged event is typically not. When the event space or log space fills up, one embodiment will delete the oldest logged event (each logged event will have a time/date stamp, as well as other needed information such as length), providing space to record the new event. In this embodiment, the most recent events will thus be found in the log space, regardless of their relative importance. Further provided is the capability to read the stored logs for event review.

In accordance with one embodiment, meter manager 328 manages the various meters embodied in the game kernel 300. This includes the accounting information for the game machine and game play. There are hard meters (counters) and soft meters; the soft meters may be stored in non-volatile storage such as non-volatile battery-backed RAM to prevent loss. Further, a backup copy of the soft meters may be stored in a separate non-volatile storage such as EEPROM. In one embodiment, meter manager 328 receives its initialization data for the meters, during start-up, from configuration manager 322. While running, the cash in manager 330 and cash out manager 332 call the meter manager's 328 update functions to update the meters. Meter manager 328 will, on occasion, create backup copies of the soft meters by storing the soft meters' readings in EEPROM. This is accomplished by calling and using EEPROM manager 334.

In accordance with still other embodiments, progressive manager 336 manages progressive games playable from the game machine. Event manager 338 is generic, like game event log manager 326, and is used to manage various gaming machine events. Focus manager 340 correlates which process has control of various focus items. Tilt manager 342 is an object that receives a list of errors (if any) from configuration manager 322 at initialization, and during game play from processes, managers, drivers, etc. that may generate errors. Random number generator manager 344 is provided to allow easy programming access to a random number generator (RNG), as a RNG is required in virtually all casino-style (gambling) games. Random number generator manager 344 includes the capability of using multiple seeds.

In accordance with one or more embodiments, a credit manager object (not shown) manages the current state of credits (cash value or cash equivalent) in the game machine, including any available winnings, and further provides denomination conversion services. Cash out manager 332 has the responsibility of configuring and managing monetary output devices. During initialization, cash out manager 332, using data from configuration manager 322, sets the cash out devices correctly and selects any selectable cash out denominations. During play, a game application may post a cash out event through the event manager 338 (the same way all events are handled), and using a call back posted by cash out manager 332, cash out manager 332 is informed of the event. Cash out manager 332 updates the credit object, updates its state in non-volatile memory, and sends an appropriate control message to the device manager that corresponds to the dispensing device. As the device dispenses dispensable media, there will typically be event messages being sent back and forth between the device and cash out manager 332 until the dispensing finishes, after which cash out manager 332, having updated the credit manager and any other game state (such as some associated with meter manager 328) that needs to be updated for this set of actions, sends a cash out completion event to event manager 338 and to the game application thereby. Cash in manager 330 functions similarly to cash out manager 332, only controlling, interfacing with, and taking care of actions associated with cashing in events, cash in devices, and associated meters and crediting.

In a further example, in accordance with one or more embodiments, I/O board server 310 may write data to the gaming machine EEPROM memory, which is located in the gaming machine cabinet and holds meter storage that must be kept even in the event of power failure. Game manager 304 calls the I/O library functions to write data to the EEPROM. The I/O board server 310 receives the request and starts a low priority EEPROM thread 344 within I/O board server 310 to write the data. This thread uses a sequence of 8 bit command and data writes to the EEPROM device to write the appropriate data in the proper location within the device. Any errors detected will be sent as IPC messages to game manager 304. All of this processing is asynchronous.

In accordance with one embodiment, button module 346 within I/O board server 310, polls (or is sent) the state of buttons every 2 ms. These inputs are debounced by keeping a history of input samples. Certain sequences of samples are required to detect a button was pressed, in which case the I/O board server 310 sends an inter-process communication event to game manager 304 that a button was pressed or released. In some embodiments, the gaming machine may have intelligent distributed I/O which debounces the buttons, in which case button module 346 may be able to communicate with the remote intelligent button processor to get the button events and simply relay them to game manager 304 via IPC messages. In still another embodiment, the I/O library may be used for pay out requests from the game application. For example, hopper module 348 must start the hopper motor, constantly monitor the coin sensing lines of the hopper, debounce them, and send an IPC message to the game manager 304 when each coin is paid.

Further details, including disclosure of lower level fault handling and/or processing, are included in U.S. Pat. No. 7,351,151 issued Apr. 1, 2008 entitled "Gaming Board Set and Gaming Kernel for Game Cabinets" the disclosure of which is incorporated herein by explicit reference.

The electronic lock according to the embodiments of the present invention may be communicatively coupled to the GMU 206 and/or PTM 28 for communication with the network and one or more servers. Additionally the prior art gaming devices 10 typically include a battery back-up to maintain certain functions in the event of a power loss such as the various meters or other electronic devices as desired or as mandated by jurisdictional regulations.

Figure 3:
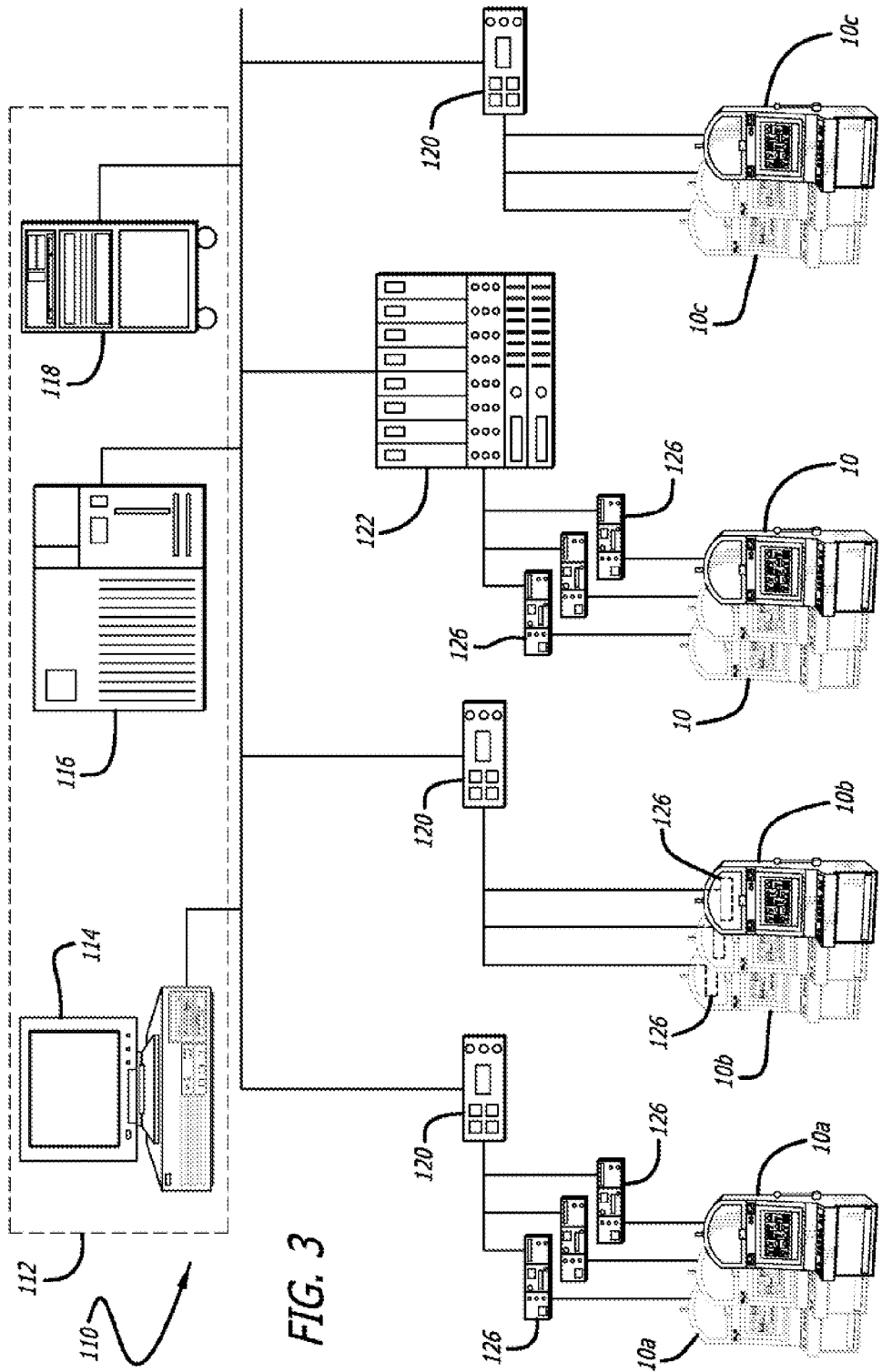
FIG. 3 illustrates an architecture for a network and system according to the prior art.

Referring now to FIG. 3, an example of the architecture for casino gaming system 100 hosting a number of gaming devices 10 is illustrated. The gaming machines 10 are connected via a network to a network bridge 120, which is used for networking, routing and polling gaming machines, including slot machines. The network bridge 120 connects to a back end system 112. Optionally, the gaming machines 10 may connect to the network via a network rack 122, which provides for a fewer number of connections to the back end system 112. Both network bridge 120 and network rack 122 may be classified as middleware, and facilitate communications between the back end system 112 and the gaming machines 10. The network bridges 120 and network rack 122 may comprise data repositories for storing network performance data. Such performance data may be based on network traffic and other network related information. Optionally, the network bridge 120 and the network rack 122 may be interchangeable components. For example, in one embodiment, a casino gaming system may comprise only network bridges and no network racks. Alternatively, in another embodiment, a casino gaming system may comprise only network racks and no network bridges. Additionally, in an alternative embodiment, a casino gaming system may comprise any combination of one or more network bridges and one or more network racks.

The back end system 112 may be configured to comprise one or more servers. The type of server employed is generally determined by the platform and software requirements of the gaming system. In one embodiment, as illustrated in FIG. 3, the back end system 112 is configured to include three servers: a slot floor controller 114, a casino management server 116 and a casino database 118. The slot floor controller 114 is a part of the player tracking system for gathering accounting, security and player specific information. The casino management server 116 and casino database 118 work together to store and process information specific to both employees and players. Player specific information includes, but is not limited to, passwords, biometric identification, player card identification, and biographic data. Additionally, employee specification information may include biographic data, biometric information, job level and rank, passwords, authorization codes and security clearance levels.

Overall, the back end system 112 performs several fundamental functions. For example, the back end system 112 can collect data from the slot floor as communicated to it from other network components, and maintain the collected data in its database. The back end system 112 may use slot floor data to generate a report used in casino operation functions. Examples of such reports include, but are not limited to, accounting reports, security reports, and usage reports. The back end system 112 may also pass data to another server for other functions. Alternatively, the back end system 112 may pass data stored on its database to floor hardware for interaction with a game or game player. For example, data such as a game player's name or the amount of a ticket being redeemed at a game may be passed to the floor hardware. Additionally, the back end system 112 may comprise one or more data repositories for storing data. Examples of types of data stored in the system server data repositories include, but are not limited to, information relating to individual player play data, individual game accounting data, gaming machine accounting data, cashable ticket data, and sound data including optimum audio outputs for various casino settings.

Figure 4A:
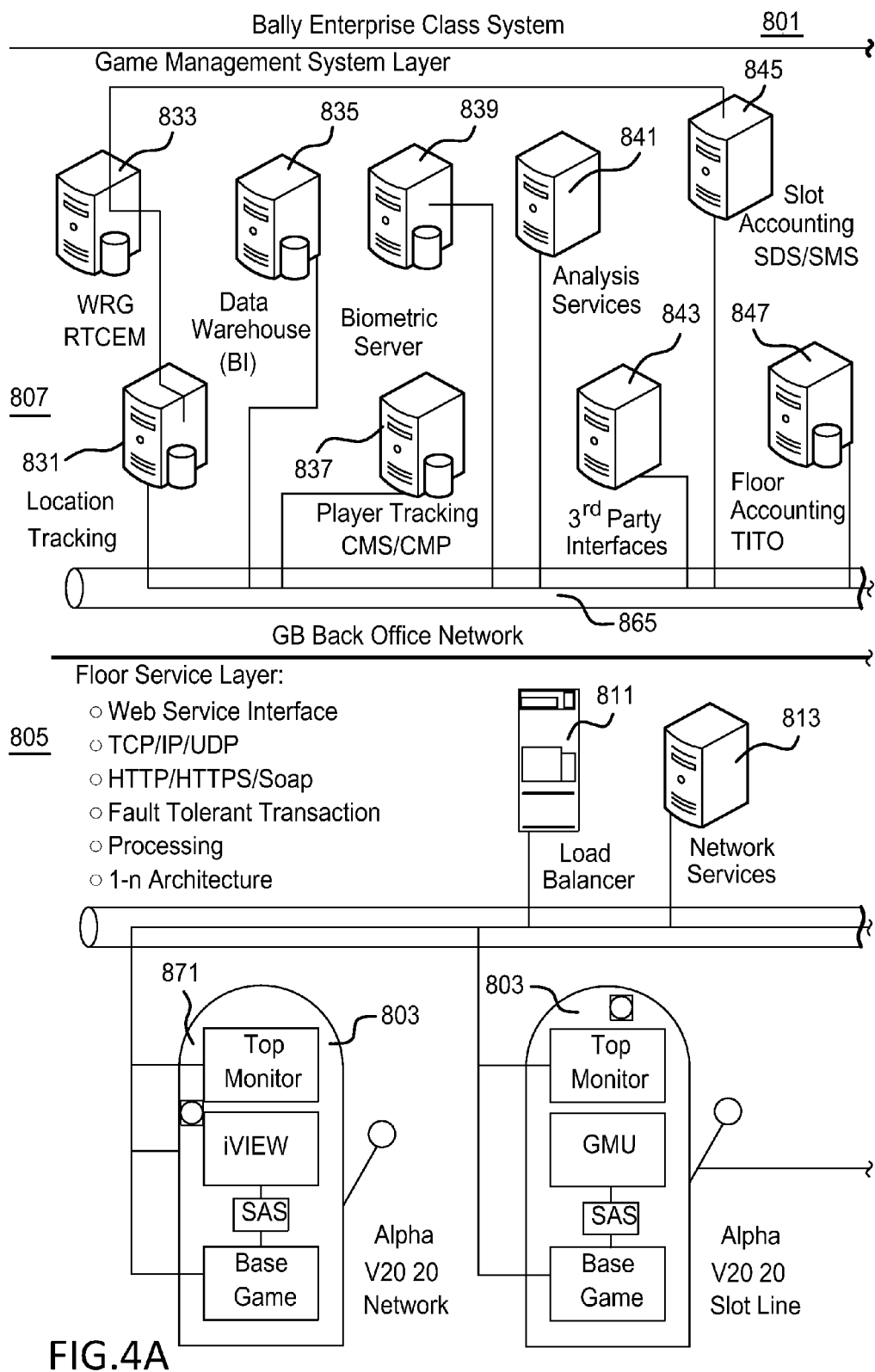
FIGS. 4A and 4B are schematic block diagrams showing the hardware elements of a networked gaming system in accordance with the prior art.
Figure 4B:
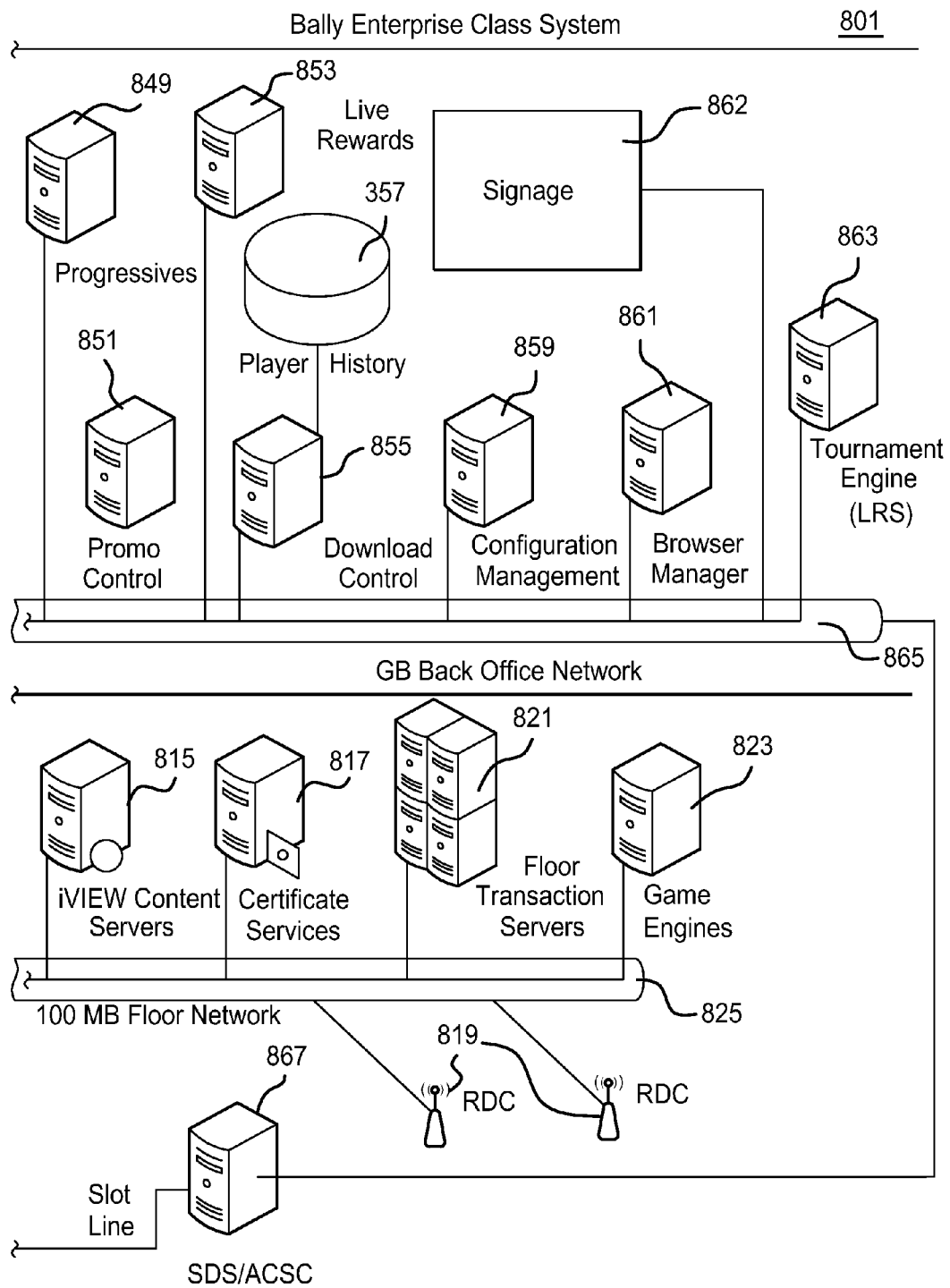

Referring to FIGS. 4A and B, a detailed example of a gaming system 801 is shown. Gaming system 801 may include one casino or multiple locations and generally includes a network of gaming terminals 803 (such as a gaming terminals 10 of the type as described in FIG. 1), floor management system (SMS) 805, and casino management system (CMS) 807. SMS 805 may include load balancer 811, network services server 813, player tracking module 28, iView (PTM 28) content servers 815, certificate services server 817, floor radio dispatch receiver/transmitters (RDC) 819, floor transaction servers 821 and game engines 823 (where the gaming terminals 803 such as gaming devices 10 operate server based or downloadable games), each of which may connect over network bus 825 to gaming terminals 803. CMS 807 may include location tracking server 831, WRG RTCEM server 833, data warehouse server 835, player tracking server 837, biometric server 839, analysis services server 841, third party interface server 843, slot accounting server 845, floor accounting server 847, progressives server 849, promo control server 851, bonus game (such as Bally Live Rewards) server 853, download control server 855, player history database 857, configuration management server 859, browser manager 861, tournament engine server 863 connecting through bus 865 to server host 867 and gaming machines 803. The various servers and gaming terminals 803 may connect to the network with various conventional network connections (such as, for example, USB, serial, parallel, RS485, Ethernet). Additional servers which may be incorporated with CMS 807 include a responsible gaming limit server (not shown), advertisement server (not shown), and a control station server (not shown) where an operator or authorized personnel may select options and input new programming to adjust each of the respective servers and gaming machines 803. SMS 805 may also have additional servers including a control station (not shown)

through which authorized personnel may select options, modify programming, and obtain reports of the connected servers and devices, and obtain reports. The various CMS and SMS servers are descriptively entitled to reflect the functional executable programming stored thereon and the nature of databases maintained and utilized in performing their respective functions.

The gaming terminals 803 include various peripheral components that may be connected with USB, serial, parallel, RS-485 or Ethernet devices/architectures to the system components within the respective gaming machine. The GMU 507 has a connection to the base game through a serial SAS connection. The system components in the gaming cabinet may be connected to the servers using HTTPs or G2S over Ethernet. Using CMS 807 and/or SMS 805 servers and devices, firmware, media, operating systems, and configurations may be downloaded to the system components of respective gaming devices for upgrading or managing floor content and offerings in accordance with operator selections or automatically depending upon CMS 807 and SMS 805 master programming The data and programming updates to gaming devices 803 are authenticated using conventional techniques prior to install on the system components.

In various embodiments, any of the gaming terminals 803 may be a mechanical reel spinning slot machine, video slot machine, video poker machine, video bingo machine, keno machine, or a gaming device offering one or more of the above described games including an interactive wheel feature. Alternately, gaming terminals 803 may provide a game with an accumulation-style feature game as one of a set of multiple primary games selected for play by a random number generator, as described above. A gaming system 801 of the type described above also allows a plurality of games in accordance with the various embodiments of the invention to be linked under the control of a group game server (not shown) for cooperative or competitive play in a particular area, carousel, casino or between casinos located in geographically separate areas. For example, one or more examples of group games under control of a group game server are disclosed in U.S. Published Application 2008/0139305, entitled "Networked System and Method for Group Gaming," filed on Nov. 9, 2007, which is hereby incorporated by reference in its entirety for all purposes.

The gaming system 801, among other functionalities such as slot accounting (i.e. monitoring the amount wagered ("drop"), awards paid) and other casino services, includes the player tracking CMS/CMP server 837 and/or data warehouse 835 storing player account data. This data includes personal data for players enrolled in the casino players club sometimes referred to as a loyalty club. An example of the personal data is the player's name, address, SSN, birth date, spouse's name and perhaps personal preferences such as types of games, preferences regarding promotions and the like. As is known in the industry and according to the prior art, at enrolment the player is assigned a created account in the player tracking CMS/CMP server 837 and is issued a player tracking card having a machine readable magnetic stripe.

When a player plays a gaming terminal 10, he/she inserts their player tracking card into the card reader 32 (FIG. 1) which communicates data to the CMS/CMP server 837 to accumulate loyalty points based upon the wagers/wins of the player. For example, a player may accumulate one loyalty point for each $5 wagered.

The system 801 may also include electronic transfer of funds functionality. For example, a player having accumulated $100 at a gaming terminal 100 may decide to "cash out" to play another gaming terminal. The player, for example using the PTM 28 to initiate communication with the system 801 for example server 837 to upload the value from the gaming terminal 10 into an electronic account associated with the player's account. The player may choose to upload all or a portion of the funds the player's established electronic account. The system would prompt the player to enter their PIN (or obtain biometrical confirmation as to the player's identity) and upload the chosen amount to their account. When the player moves to another gaming terminal 10 he/she inserts their player loyalty card into the card reader 32 to access their account. A prompt provides for the player to request funds from their account. Entering their PIN (or biometric identifier) the player can input the desired amount which is downloaded to their gaming terminal 100 for play.

Figure 5:
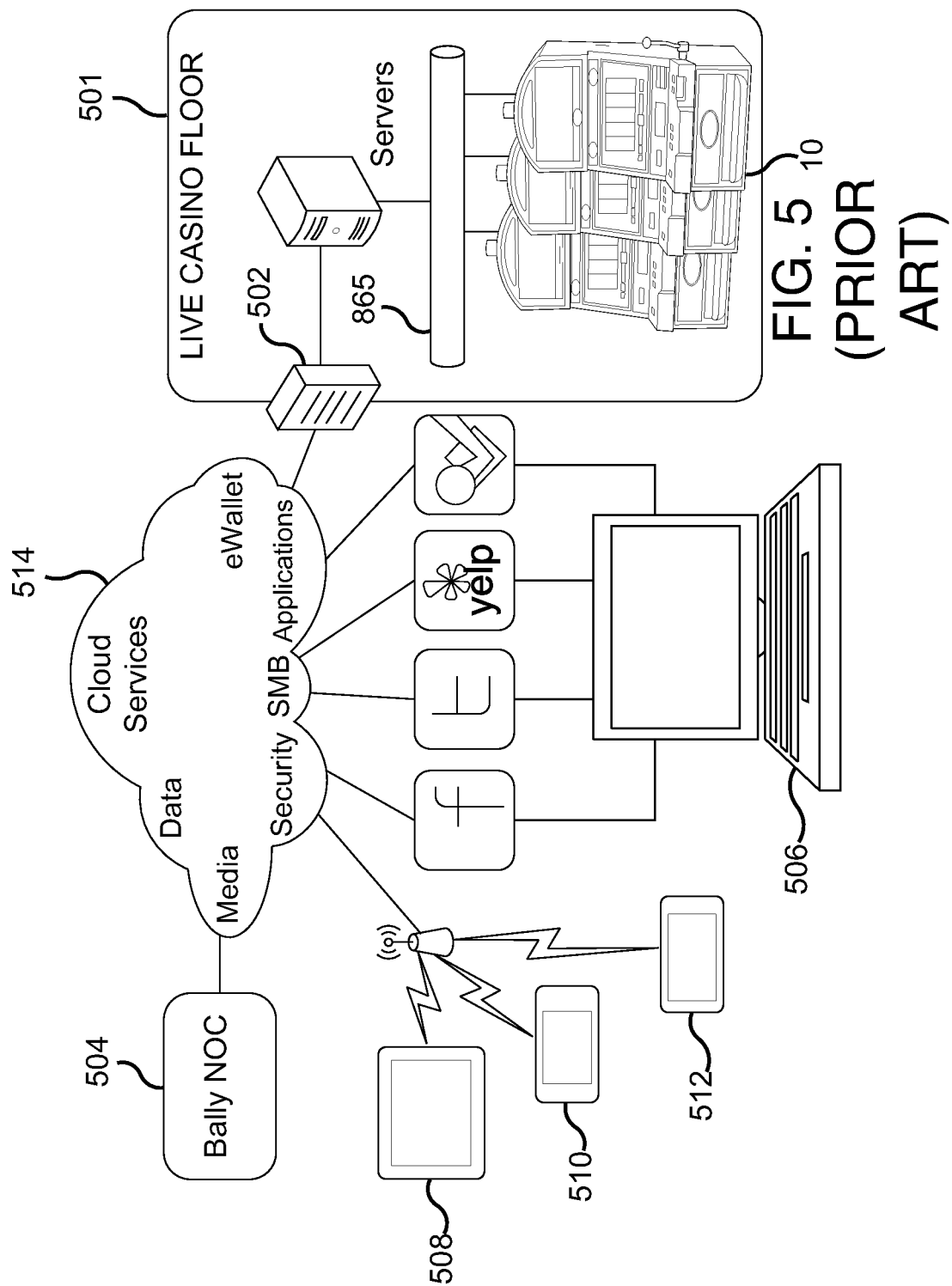
FIG. 5 illustrates an cloud and wireless architecture for a system according to the prior art.

All or portions of the present invention may also be implemented or promoted by or through a system as suggested in FIG. 5. At 501 is the gaming system which may be hosted at a casino property enterprise, across several casino enterprises or by a third party host. As described above the gaming system 501 has a network communication bus 865 providing for communication between the gaming devices 10 and various servers. Through a secure network firewall 502 the various servers are in communication with a cloud computing/storage service 514 which may be hosted by the casino enterprise, a licensed third party or if permitted by gaming regulators an unlicensed provider. The cloud service 514 provides various applications which can be accessed and delivered to, for example, personal computers 506, portable computing devices such as computer tablets 508, personal digital assistants (PDAs) 510 and cellular devices 512 such as telephones and smart phones. As but an example, the cloud service 514 may store and host an eWallet application, casino or player-centric applications such as downloadable or accessible applications including games, promotional material or applications directed to and/or affecting a casino customers interaction with a casino enterprise (such as accessing the players casino account, establishing casino credit or the like), providing bonuses to players through system wide bonusing (SMB) or specific bonsuing or comps to players, or other applications. The cloud service 514 includes security provide for secure communication with the cloud service 514 between the player/users and the cloud service 514 and between the cloud service 514 and the gaming system 501. Security applications may be through encryption, the use of personal identification numbers (PINS) or other devices and systems. As suggested in FIG. 5 the cloud service 514 stores player/user data retrieved from players/users and from the gaming system 801. The cloud serve may also store casino employee/attendant information such as identity information including name, employee number, a unique stored PIN for the attendant and any stored biometric identification such as fingerprint, iris scan, voiceprint, facial image, palm print or the like.

The players/users may access the cloud service 514 and the applications and data provided thereby through the Internet or through broadband wireless cellular communication systems and any intervening sort range wireless communication such as WiFi. The players/users may access the applications and data through various social media offerings such as Facebook, Twitter, Yelp, MySpace or LinkedIn or the like.

As but an example, a player/user may have a player account with a casino enterprise. That account may include data such as the player's credit level, their rating and their available comps. At their smart phone 512 the player/user sends a request to the cloud service 514 (perhaps through a previously downloaded application) to request the status of their available comps such as how many comp points they have and what may be available through redemption of those points (e.g. lodging, cash back, meals or merchandise). The application for the request may present casino promotions, graphics or other advertising to the player/user. The application, to support such a request, would typically require the player/user to enter a PIN. The cloud service 514 forwards the inquiry to the appropriate server which, in turn, confirms the PIN and retrieves the requested information from the data warehouse 835 or player tracking CMS/CMP server 837. Alternatively the data may be stored in the cloud service 514 and routinely updated from the data warehouse 835 or player tracking CMS/CMP server 837. In this instance the request would be responded to from data residing with the cloud service 514. The information is formatted by the cloud server 514 application and delivered to the player/user. The delivery may be formatted based upon the player/user's device operating system (OS), display size or the like.

The cloud service 514 may also host game applications to provide virtual instances of games for free, promotional, or where permitted, P2P (Pay to Play) supported gaming. Third party developers may also have access to placing applications with the cloud service 514 through, for example a national operations center (Bally NOC 504). A game software manufacturer such as Bally Gaming, Inc. may also provide game applications on its own or on behalf of the casino enterprise.

Other media such as advertising, notices (such as an upcoming tournament) may also be provided to the cloud service 514. When a player/user accesses the cloud service 514 certain media may be delivered to the player/user in a manner formatted for their application and device.

As will be described below a casino enterprise may host employee/attendant identification and authorization data as well as machine entry and access data in the cloud service 514. However regulations may prevent external hosting of such data.

The foregoing describes various features with respect to an example of an existing environment for the embodiments of the present invention. The details of the electronic lock and system will now be described.

Electronic Lock and System

Turning to FIGS. 7A-D the structure of the electronic lock 700 according to the present invention is shown. To replace a mechanical lock and provide additional functionality as hereinafter described the lock 700 includes a threaded barrel 702 which may be manufactured from brass or steel and has at one end a cap 704. The barrel 702 is sized and shaped to mimic the profile of a prior art mechanical lock. Accordingly the outer shape of the barrel 702 is adapted to be received through the bore 57 which previously passed the mechanical lock to replace the same. The barrel 702 axially passes for rotation a lock bolt 706 shown in exploded view FIG. 7D. The bolt 706 includes a threaded one end that mounts with a first nut 708 a foot 710 of the type provided on the replaced mechanical lock. The foot 710 is adapted to interact with the existing latch mechanism to release the same to unlatch the door of the gaming device 10. Rotation of the bolt 706 between a locked and an unlocked position (FIGS. 7A and 7B respectively) rotates the foot to, with or without a latching mechanism depending upon the implementation; enable the gaming device 10 door to be opened to gain access to the secure space within. Opposite the cap 704 the barrel 702 has an enlarged head 712 defining an axially disposed pocket 711.

Figure 7A:
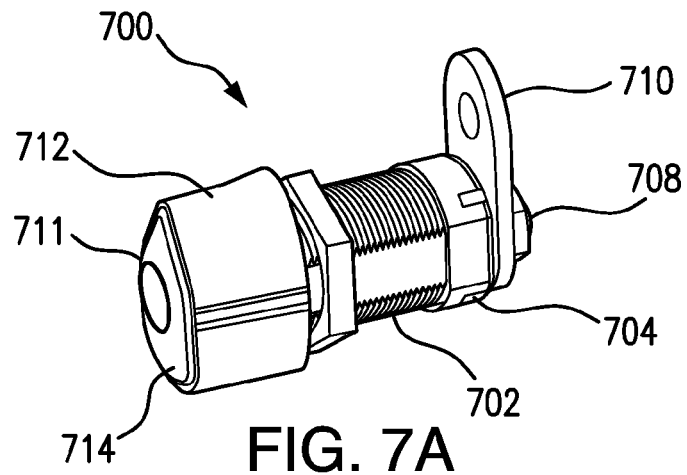
FIGS. 7A-D illustrate, respectively, a perspective view of the exterior of the electronic lock in a retained and locked condition, the exterior of the electronic lock in a released condition, the exterior of the electronic lock in an unlocked position and an exploded view of the lock.
Figure 7B:
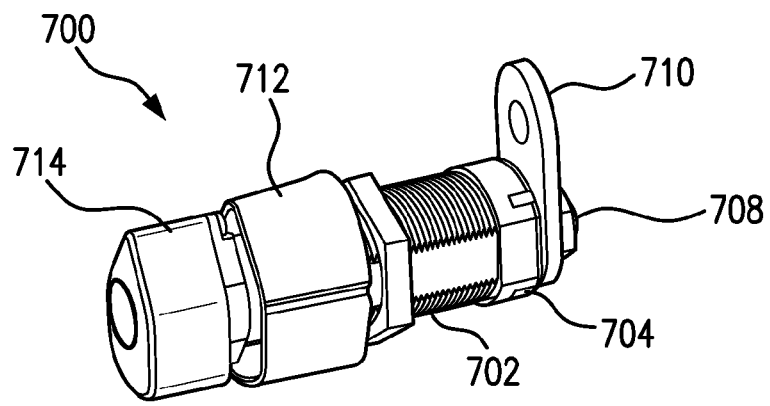
Figure 7C:
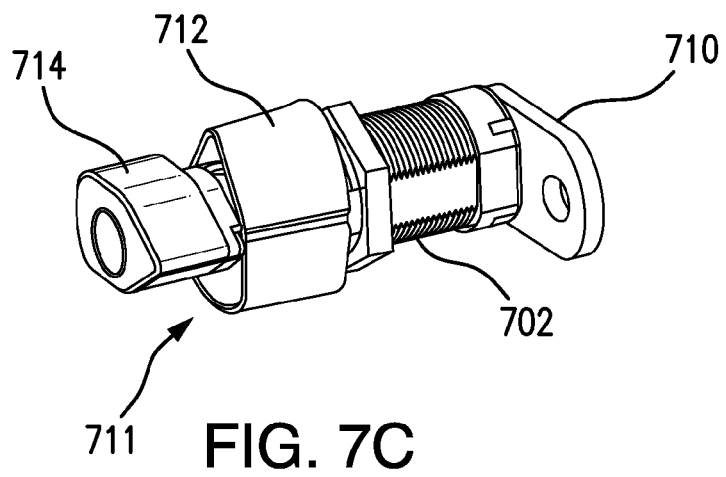
Figure 7D:
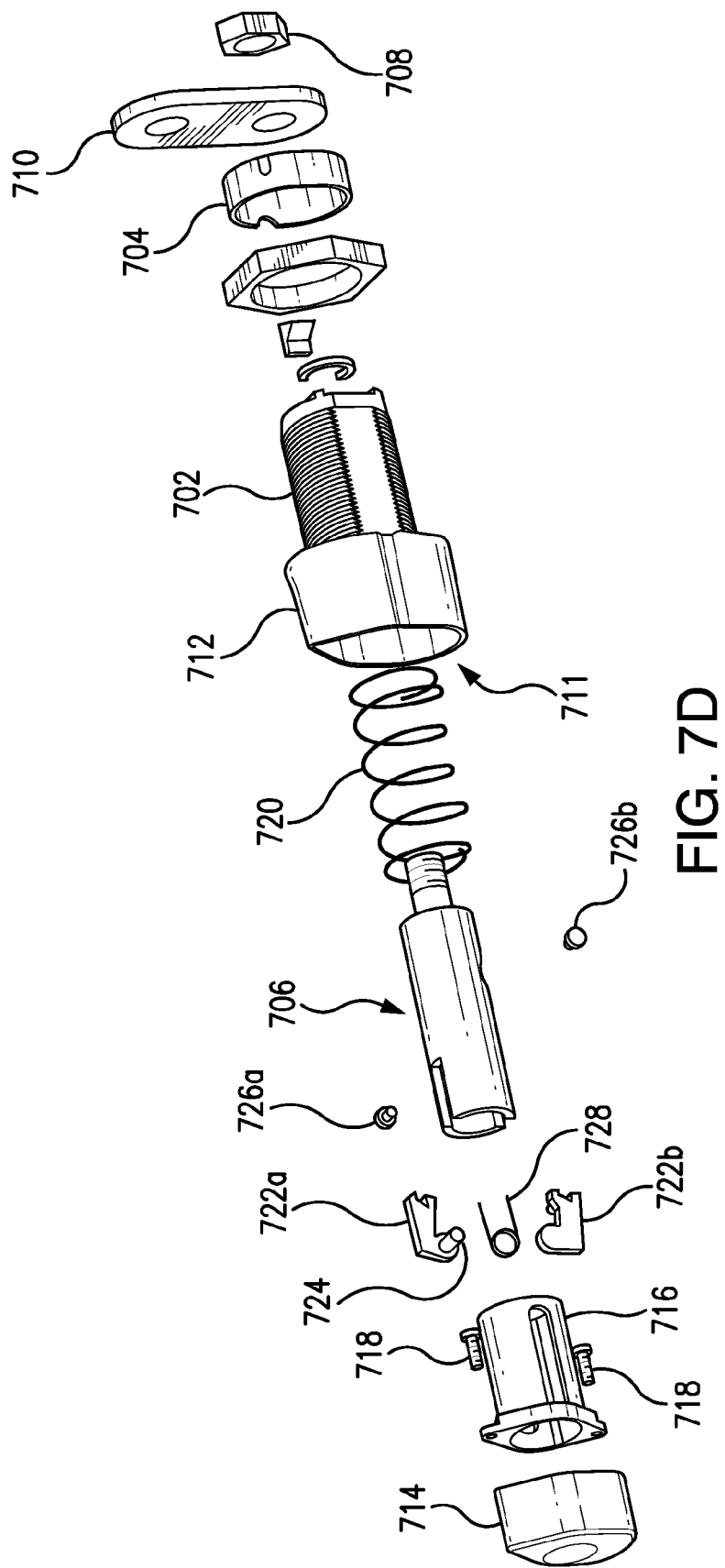
Figure 9A:
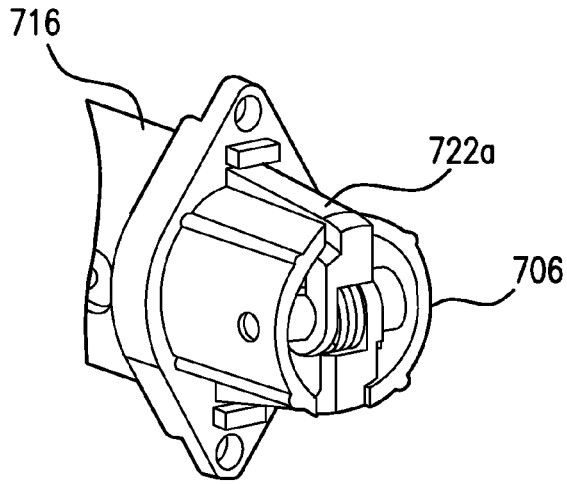
FIGS. 9A-H illustrate views of various interior components for the electronic lock.
Figure 9B:
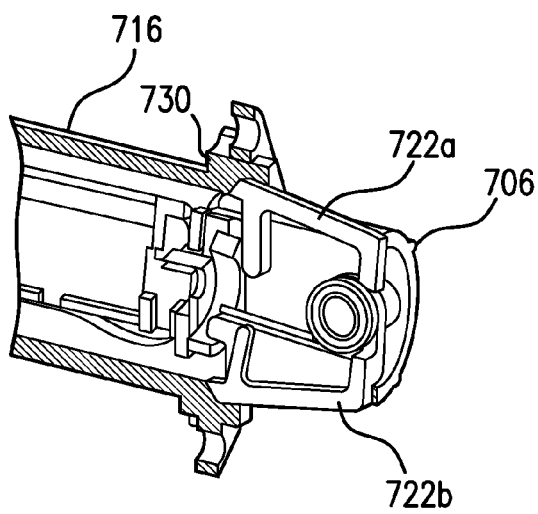
Figure 9C:
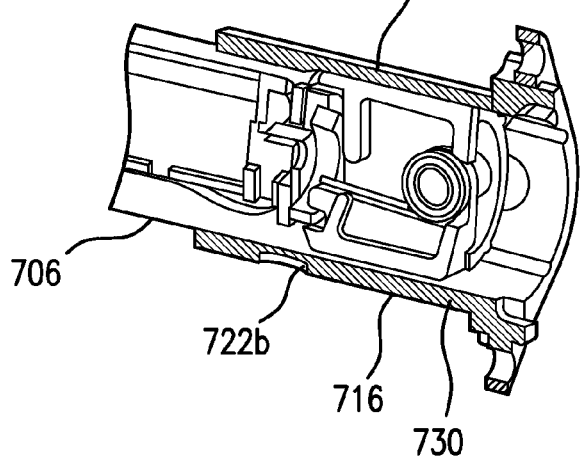
Figure 9D:
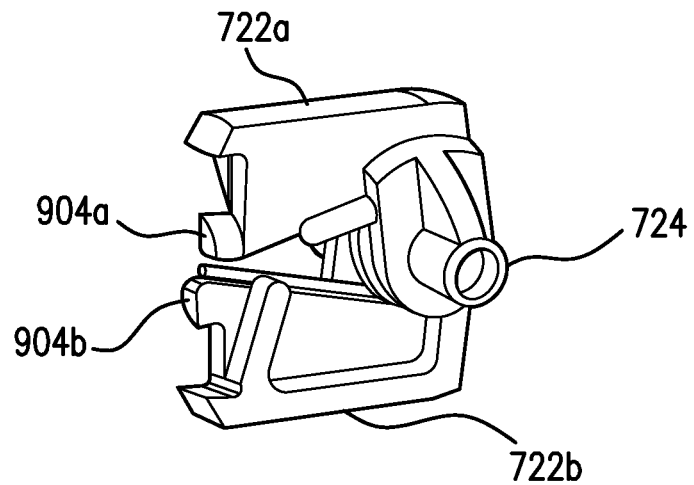
Figure 9E:
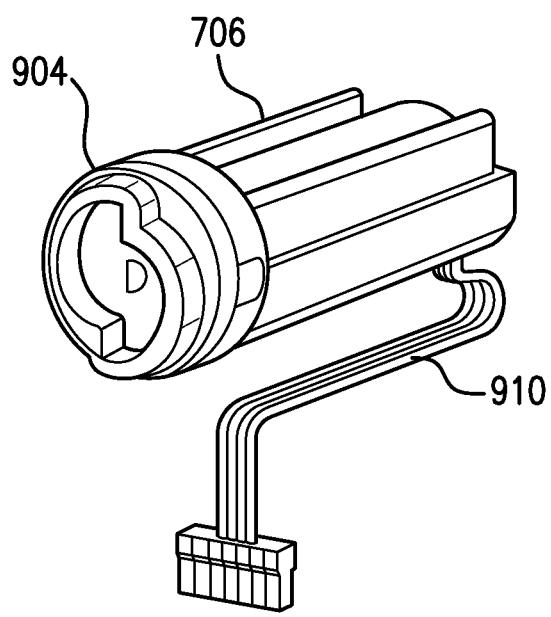
Figure 9F:
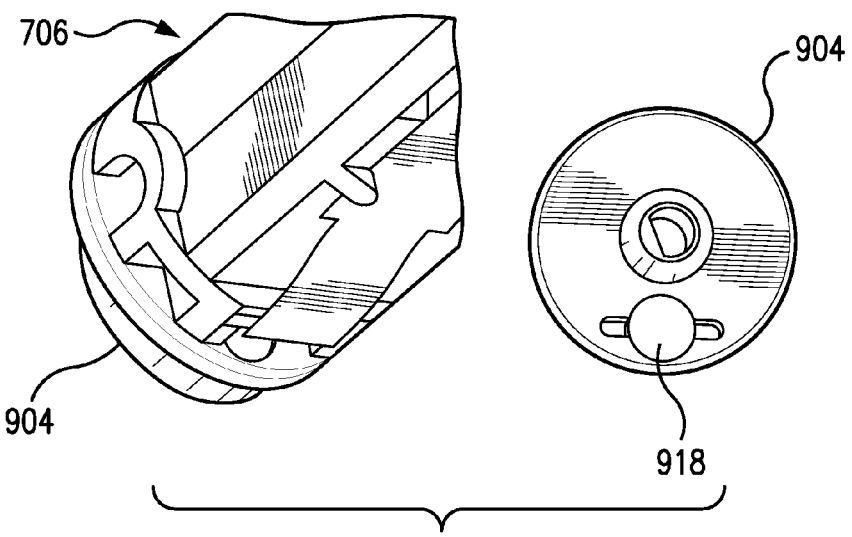

With particular reference to FIG. 7D the additional components for the lock will be described. An operator 714 is secured at one end to a cylindrical sleeve 716 configured to axially slide over the exterior of the surface and to rotate with the bolt 706 and within the barrel 702. For example the sleeve 716 may be splined over the bolt 706. Fasteners 718 may secure the sleeve 716 to the operator 714. A coil spring 720 is provided to bias the sleeve 716 and operator 714 toward a released position (to the left in FIG. 7D). At least one and preferably a pair of diametrically opposed tangs 722a, b are coupled along a hub 724 for radial inward and outward motion relative to the bolt 706. The tangs 722a, b are secured between the bolt 706 and sleeve 716 as by securing by fasteners 726a, b the hub 724 at an end of the bolt 706 opposite the foot 710. FIG. 9D shows the tangs 722a, b and their hub 724. Diametrically opposed slots in the bolt 706 accommodate the tangs 726a, b. A spring 728 urges the tangs 722a, b to spread apart about their hub 724 to capture the sleeve 716 as described below.

Figure 8A:
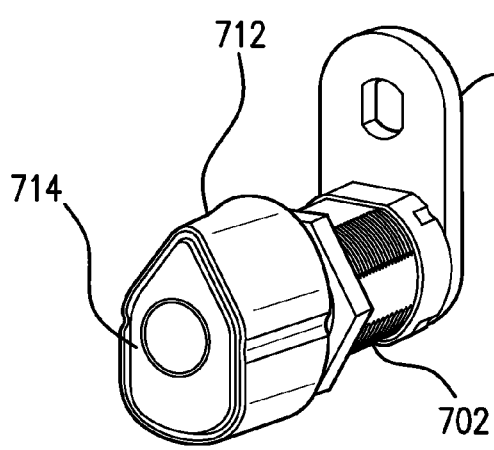
FIGS. 8A-D illustrate additional perspective views of the electronic lock as well as interior views.
Figure 8B:
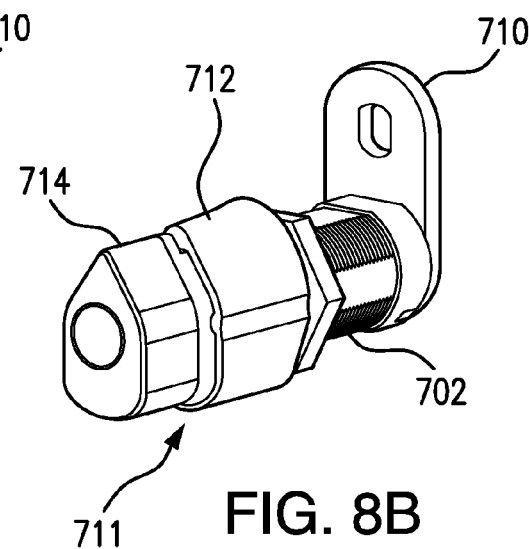
Figure 8C:
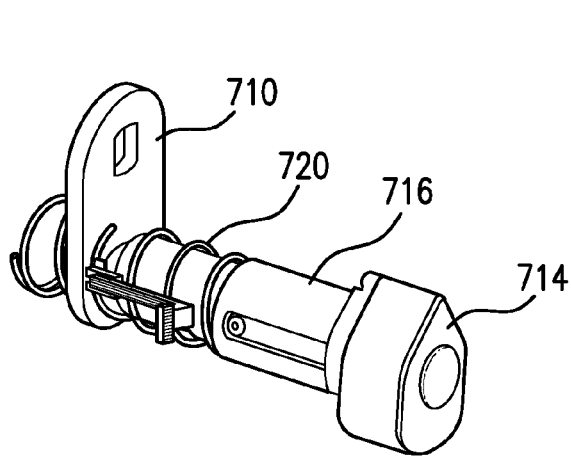
Figure 8D:
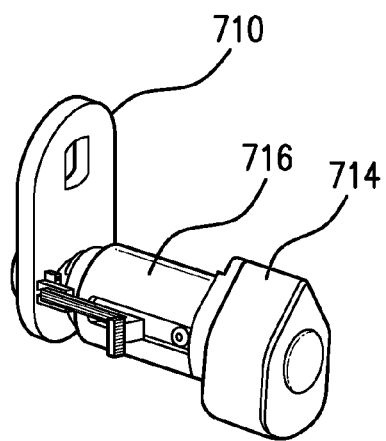

When in a locked position as shown in FIG. 7A the operator 714 is nested in the pocket 711 of the head 712 and cannot be accessed for turning for rotation of the bolt 706 and foot 710. In this position the tangs 722a, b are in a spread position such that engage and abut an annular shoulder 730 inside of the sleeve 716 proximate the operator 714 preventing the operator 714 and sleeve 716 from being pulled from the barrel 702 for manipulation as shown in FIGS. 9A-B. The spring 728 maintains the engagement of the tangs 722a, b with the annular shoulder 730 to hold the sleeve 716 in a retained position. When the tangs 722a, b are radially withdrawn, pivoting about the hub 724, they move free of the shoulder 730 whereupon the spring 720 urges the sleeve 716 and operator 714 to spring outwardly from the barrel 702 and pocket 711 to an released, unlocking position as indicated in FIGS. 7B, C and 8B. FIGS. 9A, B show partial section views where the sleeve 716 in the retained position FIG. 9C shows a section view of the sleeve 716 urged to the released position. In this position the operator 714 may be rotated as shown in FIG. 7C which, in turn rotates the bolt 706 and the attached foot 710 to an unlocked position for unlatching the gaming device 10 door. As described below in this position the spring 728 is urging the tangs 722a, b outwardly to slide along the inside surface of the sleeve 716. When the operator 714 is rotated back to a locking position (FIG. 7B) and is urged against the bias of the spring 720 to push the sleeve 716 into the barrel 702 eventually the tangs 722a, b snap outwardly under the bias of spring 728 to re-engage the shoulder 730 to retain the sleeve 716 in a retained and locked position. FIGS. 8C, D show, absent the barrel 702, the sleeve 716 in the retained and released positions respectively.

Figure 9G:
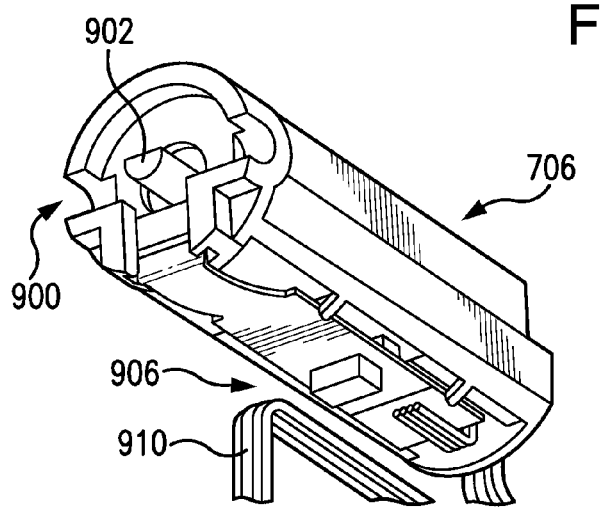
Figure 9H:
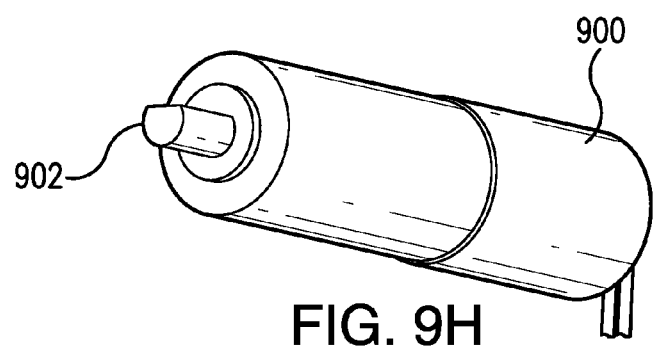

To free the tangs 722a, b from the shoulder 730 based upon an opening command from a source as hereinafter described, a small motor 900 is provided as illustrated in FIGS. 9E-H. The motor 900 is preferably a small DC motor but may by any other type. The motor 900 is disposed between the bolt 706 and sleeve 716 as being disposed in the annulus of the cylindrical bolt 706 as shown in FIG. 9G. At one end the motor 900 has a driven shaft 902 which mounts an annular cam 904 having a cylindrical surface to receive followers 904a, b (FIG. 9D) on the tangs 722a, b. Upon receiving power from a controller as described below the motor 900 rotates the cam 902 which urges the tangs 722a,

*b* to be withdrawn against the bias of the spring 728 to disengage the shoulder 730 of the sleeve 716 whereupon the sleeve 716, under the bias of the spring 729, is urged outwardly from the barrel 702 to un-nest the operator 714 from the pocket 711 of the head 712 pocket 711. In an embodiment upon an unlock command a controller 906 associated with the motor 900 commands the motor to rotate the cam 904 through one full 360° revolution from a locked or "home" position. During this revolution at approximately 180° from the home position the tangs 722*a, b* have fully disengaged the shoulder and the sleeve 716 "pops" outwardly to the released position to cause the operator 714 to be freed from the constraint of the pocket 711 of the head 712 for rotation. In this position the operator 712 may be rotated to an unlocked position shown in FIG. 7C which rotates the sleeve 716 and bolt 706 to move the foot 710 to release the latch. The rotation of the cam 902 for the remaining 180° returns the cam 902 back to home. The tangs 722*a, b* are restrained against spreading radially outward by the inside surface of the sleeve 716. When the operator 714 is returned to a locked position (FIG. 7B) and pushed inward against the bias of the spring 720 when the shoulder 730 clears the tangs 722*a, b* they spring radially outward under the bias of the spring 728 to re-engage the shoulder 730 to capture the sleeve 716 in the retained and locked position. In this position the operator 714 is inaccessible to rotate the bolt 706 and foot 710.

Figure 6A:
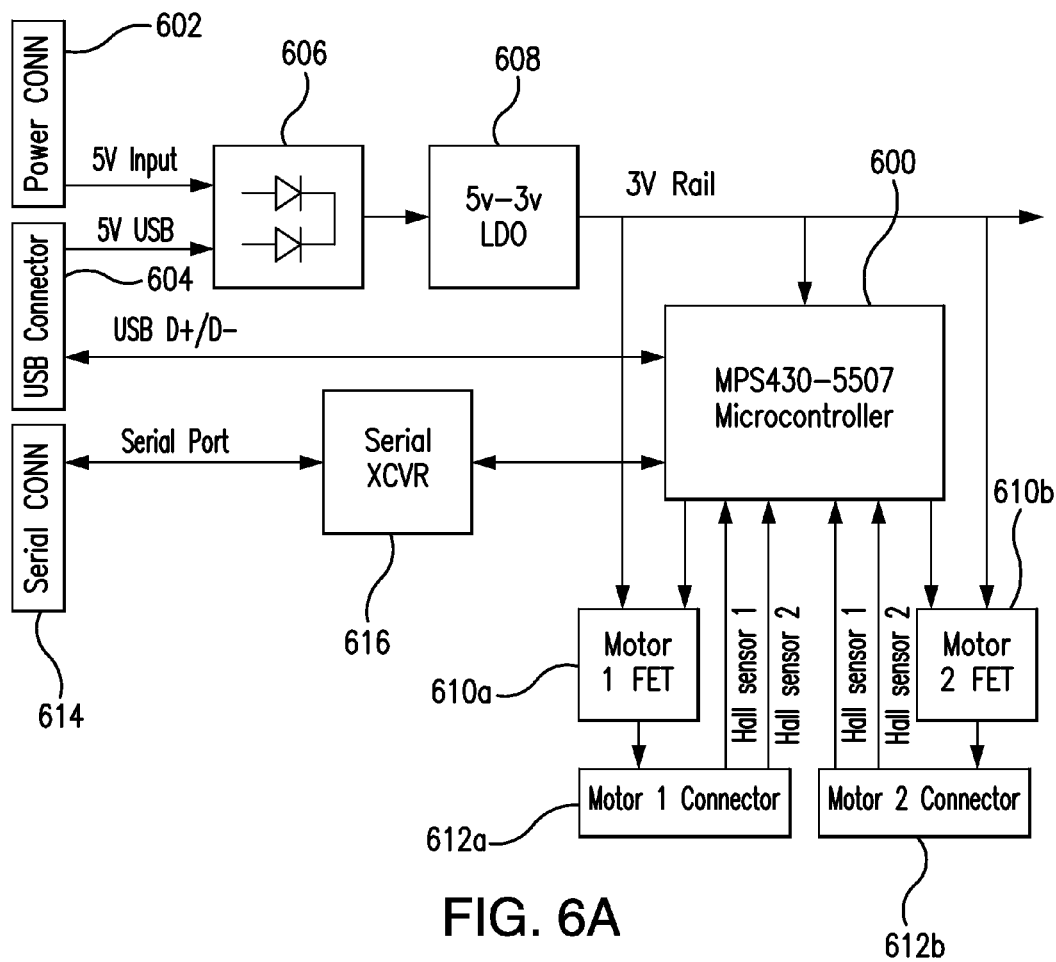
FIG. 6A is an electrical diagram for the controller for the electronic lock according to an embodiment of the present invention.

To control the operation of the motor 900 the controller 906 is provided. FIG. 6A is a circuit diagram for an embodiment of the controller 906. The controller 906 may be integrally provided with the motor 900 to reside within the bolt 706 or may be disposed elsewhere. A harness 910 (FIG. 9E, G) is provided to couple the controller 906 and motor 900 to power and data signal sources as described herein. The controller 906 is provided with power by a power connection 602 and alternatively from a USB connector 604. A switch 606 provides the power through a regulator 608 to the controller microcontroller 600. Power from the regulator 608 is also provided paid of field effect transistors 610*a, b* and motor connectors 612*a, b*. A pair of Hall Effect sensors are provided to determine the position of the rotation of the motor 900 shaft and cam 902 to confirm full rotation for release of the tangs 722*a, b* and return to the home position. One or more magnets 918 (FIG. 9F) on the reverse side of the cam 904 interacts with the sensors to provide position data to the microcontroller 600. A serial port 614 coupled to the controller 600 through a transceiver 616 provides a source for command signals from any one of various sources such as the network or a connected portable device. In an embodiment a wireless connection may provide for providing wireless control signals to the microcontroller 600.

Figure 6B:
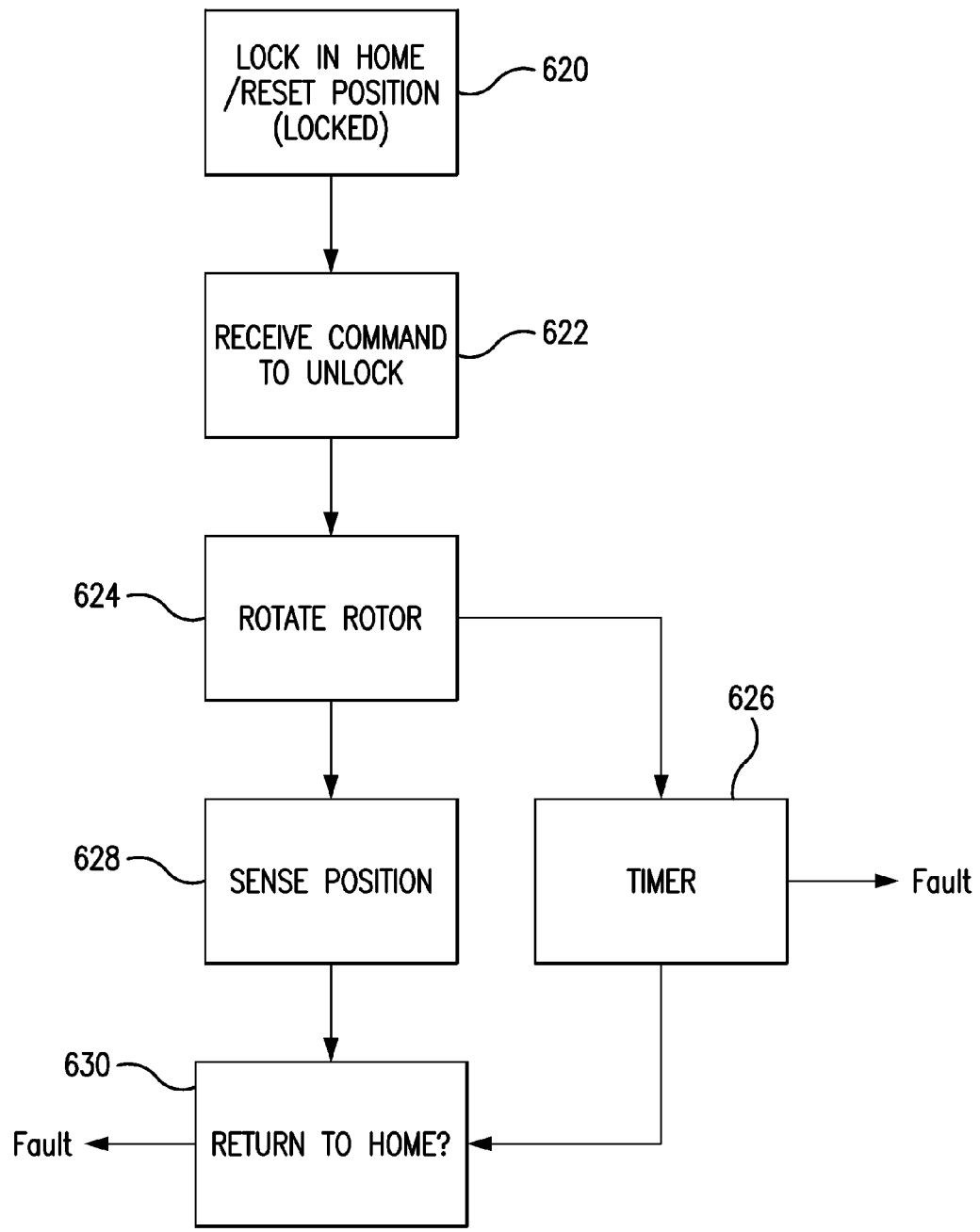
FIG. 6B is a logic diagram for the operation of the controller.

FIG. 6B is a logic diagram for the operation of the controller 906. At 620 the electronic lock 700 is in the locked and retained position which is also designated as the "home" position for the controller 906. When the controller 906 receives an unlocking command at 622 the motor 900 is energized and at 624 begins to rotate its shaft and the cam 902. A timer is initiated at 626 and is configured to measure, in conjunction with the Hall Effect sensors, the expected time for the full 360° rotation of the cam 902. The Hall Effect sensors at 628 sense the position of the rotation of the cam 902. If the timer has expired without sensing the full rotation of the cam 902, a fault condition is issued. Similarly if the cam 902 fails to return to the home position at 630 a fault condition is issued. In the event of a fault or a power interruption an external source such as a portable device through a USB connection 604 and/or external transmitter may be used to issue a command to resolve the fault. In an embodiment the operator 714 may be provided with a keyed lock (not shown) coupled to the motor shaft 902 or cam 904 to manually rotate the cam 904 to release the tangs 722*a,b* and provide a manual override.

The controller 906 may be in communication with the network through the GMU 206 and/or PTM 28 or may be in communication with a wireless network such as Bluetooth or other near field network. Thus unlocking commands may be sent to one or more gaming device 10 electronic locks 700 remotely. Additionally or alternatively the PTM 28 or a separate circuit in the gaming device 10 may locally issue the unlocking command.

To provide for release of the electronic lock 700 for only authorized personnel, in one embodiment, the electronic lock 700 and system includes a requirement for authentication for operation. Authentication may require an issued attendant/employee card to enable commands for unlocking the electronic lock 700 to gain access to the gaming device 10. For example, a casino operator or attendant inserts an identification card into the card reader 32 of the gaming device 10. Typically, the identification card has a magnetic stripe to hold an identifying data specific to the attendant. Alternatively, the identification card may be a "smart card" or electronic button having integrated circuits for storage and processing of user data. Optionally or additionally, the system may require additional or alternate authentication of the user. In one example embodiment, the casino attendant must enter a password (PIN) at, for example, the PTM 28. The password may be in addition to the use of a card. The read card and entered password (if required) may be sent through the network to the back end system 112 to verify and authenticate the user (e.g. casino attendant). One or more servers and data structures may store authentication data associated with each authorized attendant including their card number and PIN. Additionally, in an optional embodiment, the authentication process may incorporate biometrics. For example, the casino attendant may be required to submit a fingerprint sample, or other biometric type sample in addition to using an identification card and/or PIN. The PTM 28 would be configured, for example, to read the biometric feature and for this purpose may include a camera, iris or fingerprint scanner The one or more servers and data structures may store records of previously obtained employee biometric data, such as fingerprint samples, partial fingerprint samples, iris scans, etc. as described below. At the time an employee, such as casino attendant, wishes to open a gaming device 10, an additional biometric sample is obtained. The additional obtained sample is then transmitted via the network to the back end for comparison with the originally obtained biometric sample. If the samples match, the employee's identity is authenticated, and the employee may proceed with commanding the electronic lock 700 to unlock the gaming device 10. The command may originate from a back end server or a command entered by security personnel at the back end or the operator may invoke the command locally at the gaming device 10 such as by selecting an opening command displayed at the PTM 28 or primary game display 14.

Each access event is preferably recorded in a log retained in one or more back end servers. Thus when an attendant seeks access and acquire the require authorizations, an event would be logged including data of the date, time, attendant identification and event information. The event information may be acquired through the attendant entering a code, e.g. machine fault and re-boot, or the like.

In a specific example, a drop crew must remove and replace the cash boxes from a row of twenty-four gaming devices 10. Each cash box (not shown) is located within the interior of a gaming device 10 and is secured by its own locking mechanism. Currently these cash box locks are mechanical locks of the type described above in relation to the prior art. However, using electronic locks according to the present invention for cash boxes as well would provide an advantage. A supervisor would insert her ID card into a gaming device 10 at the front of the row of a bank of gaming devices 10. Next, the supervisor enters the desired task activity on a user interface. Specifically, for this example, the supervisor would select or enter "drop this row" as the desired entry, and then would be required to enter her PIN. The entered PIN is evaluated to determine whether is corresponds to the inserted ID card. If the correct PIN was entered, a server or local controller would initiate the command to the controller 906 to open the electronic locks 700 for the doors and/or cash box electronic locks. For example, in one embodiment, each of electronic locks 700 for the cash boxes in the row of twenty-four gaming devices would simultaneously unlock. Alternately, in another embodiment, on each gaming device 10, the electronic lock 700 secures an access panel to the cash box. Once the attendant has been authenticated the "row drop" request, the electronic locks 700 access panels to the cash boxes release at specific time intervals. For example, the access panel may release at three second intervals, one at a time to give the drop crew a consistent flow of removing the cashbox from the open panel, and replacing it with an empty one. After replacing each cashbox, the casino attendant closes the access panel, which would automatically "lock" the panel securely shut. In this example, the drop process is efficiently and timely executed, thereby resulting in a consistent drop process. Those skilled in the art will appreciate that any predetermined time interval may be utilized.

In another example, representing an optional embodiment, a wireless handheld device is utilized. For example, referring to the above described embodiment, the supervisor uses a handheld device to perform the "drop row" task. The handheld device includes a user interface for interacting with a supervisor or other use. The supervisor selects the desired row of gaming machines 10 from the handheld device and authorizes the drop. Additionally, in an optional embodiment, the supervisor may be required to enter a PIN or password before the drop is allowed. Furthermore, the handheld device permits the drop to be performed without requiring input from a gaming machine user interface. In this embodiment it may be required that the back end server issue the commands to open the locks as well as record the event in the log. Examples of data that can be collected and reported by the electronic lock 700 associated with a centrally managed system include, but are not limited to: access grant or revocation by any particular employee and the identity of the person granting or revoking access; prevent access to secured devices during non-working hours a.k.a. "off-shift"; time stamp and identification of device accessed; duration of access to devices for work performance metrics.

A variety of authentication methods may be incorporated into the electronic lock. In one embodiment, numerical codes, passwords or pass-phrases may be used for authentication. For example, an electronic lock may require entry of the correct code in order to release a lock. A device such as a keypad, or other user interface, may be provided to allow for entry of the pass code. Optionally, a user may enter the pass code on a wireless device such as, but not limited to, a PDA, cellular phone, or smart phone.

Alternately, security tokens may be used for authentication purposes. More particularly, a user may be required to scan or swipe a security token such as a smart card, to release a lock. Optionally, a security token may interact with a lock via wireless means. For example, infra-red, Bluetooth, or radiofrequency data transfer methods can be used to send and receive data, thereby permitting access to a lock.

The lock controller 906 may also incorporate fault control and reporting mechanisms such as, but not limited to: a lock 700 that does not open after being commanded to do so; a fault for no lock open after motor 900 rotation detected; a fault for no open sense after a certain period of time. In accordance with one or more embodiments, the controller 906 may require pull-ups (or downs) on Hall Sensor inputs to ensure no false activation based on a broken harness or non-connected harness. The controller 906 may incorporate some method of providing tamper detection for external overdrive of motor lines and sensor outputs forcing unlock activation to ensure harness tampering cannot be done without triggering a fault. Additionally, in accordance with one or more embodiments, a robust method of ensuring the electronic lock 700 is home on initial start-up and that the electronic lock 700 has been installed and aligned to home once is provided. Other embodiments prevent power on/interruption from causing a false unlock, while still others return the electronic lock 700 back to home if an unlock operation is interrupted via power loss. The controller 906 may store lock states, a history of commands, controller state (power) and time stamp history in its memory. Other diagnostics/checks may include a motor 900 detect method to ensure the electronic lock 700 is attached to controller 906, the ability to detect winding resistance, a timeout error if the lock motor is activated more than a certain number of seconds with no unlock sensed, an error for no Hall sense on cam 904 after a certain number of seconds, and the like. In accordance with one or more embodiments, battery back-up of the controller 906 may provide for power fail access.

The controller 906 may provide an external override control method in the event of main power failure within the installed device. Main power-fail external override methods: secondary external connector that has flush terminals for remote power and secure serial communications to controller, such as USB. External Power contacts and serial interface to authenticate lock open command Controller with on board battery for fault power. New MPS430 CPUs can live in standby for over 10 years on a coin cell. Use larger battery for lock operation and non-powered access for years. Battery is only active in power off condition. Use RFID/NFC antenna on machine to allow override via smart phone or passive secured RFID tag. Separate COM channel to back end system or bank controller (Ethernet, RS-485 . . . ) for remote activation of lock. Power over Ethernet (POE) alternate channel to bank or back end system for power and COMs Power over control lines, such as CAN bus, simple two wire interface Contactless power pad on side of machine with wireless low speed COM for emergency access. Powers controller and provides encrypted com access to open lock.

The electronic lock 700 being an electronically controlled device may incorporate methods to ensure no unauthorized actuation. In the preferred embodiment the control would be an encrypted command where a key is stored in the controller 906 and a when an unlock command is issued either from within the installed enclosure's control, remote system control or the external control connector, the command is verified as genuine by the controller 906 prior to activation and unlocking of the device. The encryption key method can be implemented in a number of methods. In this design the controller 906 may also be downloaded with new keys via the back end system or via a port on the controller 906 directly. They may also be loaded via the external power/control port however for security purposes this is not a preferred method. The controller's 906 unique chip serial number could also be incorporated into the security scheme thus potentially eliminating non-genuine control. It is envisioned that the installed cabinet control of the electronic lock 700 would be via a serial communications port however other methods are also possible such as parallel, optical and wireless. It is also envisioned that the external emergency access port would be USB to provide operating power and communications but may be any other comparable method to power and communicate with the controller 906 and actuate the electronic lock 700. Additional security features may also be incorporated as detection of non-commanded lock activation power or sensor drive via an external source between the controller 906 and the electronic lock 700. Detection of such events may activate silent or active alarm states locally and/or to a back end system or security station. The lock mechanism may contain a serial number, encryption device or other unique ID mechanism that communicates to the controller 906 or host server to ensure genuine activation commands only open the electronic lock 700.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention, which is set forth in the following claims.

What is claimed:

1. In an environment including a communication network an electronic lock for replacing a mechanical lock for a gaming device having a power source and having a cabinet including a door locked by said mechanical lock closed to secure an interior space of the cabinet, said mechanical lock having an exterior profile to be received through and secured in an opening in one of said cabinet and door and a rotatable foot to, in a locked position, engage structure to lock the door closed and in an unlocked position disengage said structure to unlock the door, said electronic lock comprising:
   a barrel having an exterior profile corresponding to the exterior profile of the mechanical lock to be received and secured in said opening replacing said mechanical lock, said barrel at one end including a head with a pocket;
   a lock bolt axially disposed within the barrel for axial rotation and having at one end said locking foot;
   a cylindrical sleeve received over said barrel and coupled at one end to an operator, said sleeve mounted to said bolt for rotation therewith and for axial displacement along said bolt from a retained to a released position;
   a motor axially disposed between at least one of said bolt and sleeve to rotate at one end a cam;
   at least one tang disposed between said bolt and sleeve and including a follower engaging said cam, said cam (i) in a first position causing said tang to capture said sleeve at a first axial position along said bolt defining said retained position whereat said operator nests within said head pocket against rotation of the said sleeve and (ii) in a second position to release said sleeve for movement to a second axial position along said bolt defining an extended released position whereat said operator is released from said pocket for rotation of the sleeve and said bolt from a locked to an unlocked position; and
   a controller adapted to receive commands through said network for controlling said motor to rotate said cam between said first and second positions, said motor and controller coupled to said power source for controlling and powering said motor for rotation of said cam.

2. The electronic lock of claim 1 comprising said controller configured to receive said commands wirelessly.

3. The electronic lock of claim 1 comprising a spring to bias said sleeve to said extended released position when said cam is rotated to said second position.

4. The electronic lock of claim 3 comprising said pocket and operator have mating asymmetrical cross-sections.

5. The electronic lock of claim 1 comprising tang biasing means to bias said tang toward said first position whereby urging said operator into said pocket axially displaces said sleeve to said first position whereat said tang is urged to capture said sleeve.

6. The electronic lock of claim 1 comprising said tang includes a chamfered surface to engage a mating annular surface inside of said sleeve.

7. The electronic lock of claim 1 comprising a pair of diametrically arranged tangs.

8. In an environment including a communication network and host server a system including electronic locks to replace a mechanical locks for gaming devices each having a power source and (i) a cabinet including a door locked by said mechanical lock closed to secure an interior space of the cabinet, said mechanical lock having an exterior profile to be received through and secured in an opening in one of said cabinet and door and a rotatable foot to, in a locked position, engage structure for locking the door closed and in an unlocked position disengage said structure for unlocking the door, said system comprising:
   a plurality of said electronic locks each including,
   a barrel having an exterior profile corresponding to the exterior profile of the mechanical lock to be received and secured in said opening replacing said mechanical lock and at one end a head defining a pocket;
   a lock bolt axially disposed within the barrel for axial rotation and having at one end a mount for said locking foot;
   a cylindrical sleeve received over said barrel and coupled at one end to an operator, said sleeve mounted to said bolt for rotation therewith and for axial displacement along said bolt from a retained to a released position;
   a motor axially disposed between at least one of said bolt and sleeve to rotate at one end a cam;
   at least one tang disposed between said bolt and sleeve and including a follower engaging said cam, said cam (i) in a first position causing said tang to capture said sleeve at a first axial position along said bolt defining said retained position whereat said operator nests within said head pocket against rotation of the said sleeve and (ii) in a second position to release said sleeve for movement to a second axial position along said bolt defining an extended released position whereat said operator is released from said pocket for rotation of the sleeve and said bolt from a locked to an unlocked position; and
   a controller adapted to receive commands through said network for controlling said motor to rotate said cam between said first and second positions, said motor and controller coupled to said power source for controlling and powering said motor for rotation of said cam apparatus to receive attendant authorization information and provide the same over said network to server; and said server configurable to (a) establish a log for each gaming machine to record locking and unlocking event information for each electronic lock, (b) an authorization account and to issue said locking and unlocking commands upon receipt and validation of said authorization information.

9. The system of claim 8 comprising configuring said account to store one or more authorization criteria for said attendants, said server configured to compare said authorization information with said stored authorization criteria to determine said authorization.

10. The system of claim 9 comprising said authorization criteria includes criteria selected from the group of (a) PIN number authorization, (b) scanning of an identification card and (c) biometric identification.

11. The system of claim 8 comprising apparatus for an attendant to enter data at the gaming device related to the event supporting a request for an unlocking command, said data provided to said server for storing at said server.

12. The system of claim 8 comprising apparatus for providing external power and commands to said motors in the event of a power failure.

* * * * *